US008835826B2

United States Patent
Lee et al.

(10) Patent No.: US 8,835,826 B2
(45) Date of Patent: Sep. 16, 2014

(54) PIXEL CIRCUIT, DEPTH SENSOR HAVING DUAL OPERATING MODE FOR HIGH AND LOW INCIDENT LIGHT AND OPERATING METHOD

(75) Inventors: Yong-Jei Lee, Seongnam-Si (KR); Yoon-Dong Park, Yongin-Si (KR); Young-Gu Jin, Osan-Si (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 188 days.

(21) Appl. No.: 13/611,607

(22) Filed: Sep. 12, 2012

(65) Prior Publication Data
US 2013/0126716 A1 May 23, 2013

(30) Foreign Application Priority Data
Nov. 17, 2011 (KR) .................. 10-2011-0119903

(51) Int. Cl.
*H01L 27/00* (2006.01)
*G01J 1/02* (2006.01)
*G01S 17/89* (2006.01)
*G01J 1/18* (2006.01)
*G01J 1/44* (2006.01)
*G01S 7/491* (2006.01)
*H04N 5/369* (2011.01)

(52) U.S. Cl.
CPC .................. *G01J 1/44* (2013.01); *G01J 1/0228* (2013.01); *G01S 17/89* (2013.01); *G01J 1/18* (2013.01); *G01S 7/4914* (2013.01); *H04N 5/3696* (2013.01)

USPC ...................................... 250/208.1; 250/214 R

(58) Field of Classification Search
USPC .................... 250/208.1, 214 R, 205, 214 AL; 396/100, 108; 348/294–311; 257/236–239, 290–292, 440
See application file for complete search history.

(56) References Cited

U.S. PATENT DOCUMENTS 8,159,576 B2 * 4/2012 Fujita et al. .................... 348/294
2010/0153062 A1 6/2010 Maltseff

FOREIGN PATENT DOCUMENTS

KR          100265495 B1    6/2000
KR        1020090097416     9/2009
WO         2009018647 A1    2/2009

* cited by examiner

*Primary Examiner* — Que T Le
(74) *Attorney, Agent, or Firm* — Volentine & Whitt, PLLC

(57) ABSTRACT

A pixel circuit for a depth sensor operating in a detection period and an output period in either a first operating mode (high incident light intensity) or a second operating mode (low incident light intensity). The pixel circuit includes a light receiving unit generating charge in response to the incident light, a signal generation unit accumulating charge in a FDN in response to a transmission signal, reset signal and selection signal during the detection period, and generating an analog signal having a level corresponding to a voltage apparent at the FDN during the output period, and a refresh transistor coupled between a supply voltage and the light receiving unit and discharging charge to the supply voltage in response to a refresh signal.

20 Claims, 19 Drawing Sheets

PIXEL CIRCUIT, DEPTH SENSOR HAVING DUAL OPERATING MODE FOR HIGH AND LOW INCIDENT LIGHT AND OPERATING METHOD

CROSS-REFERENCE TO RELATED APPLICATION(S)

This application claims priority under 35 USC §119 to Korean Patent Application No. 10-2011-0119903 filed on Nov. 17, 2011, the subject matter of which is hereby incorporated by reference.

BACKGROUND

The inventive concept relates generally to pixels circuits and depth sensors. More particularly, the inventive concept relates to pixel circuits capable of generating a signal corresponding to a distance to an object under ambient light conditions and a depth sensor including the pixel circuit.

Generally, a complementary metal oxide semiconductor (CMOS) image sensor generates electrical charge in response to incident light received by a light receiving unit, such as a photo diode. The CMOS image sensor accumulates the charge in a floating diffusion node so that a voltage apparent at the floating diffusion node corresponds to the intensity of the incident light. Then the CMOS image sensor is able to generates an analog signal having a magnitude that corresponds to the voltage of the floating diffusion node.

Depth sensors may use a CMOS image sensor to measure (or detect) distance from a target object. In this capacity, conventional depth sensors often use a time of flight (TOF) method to approximate the distance. That is, the depth sensor may emit light towards the target object, sense light reflected from the target object, and calculate the intervening distance using the time of flight for the reflected light. Ambient light (e.g., incident environmental illumination) will affect the ability of the depth sensor to determine distance, and is typically compensated by means of an offset within TOF methods.

Those skilled in the art will recognize that when levels of ambient light are relatively high, the floating diffusion node of the depth sensor may become charge saturated as a result of ambient light. Under such circumstances, it becomes very difficult to discriminate the reflected light, and the depth sensor cannot generate an analog signal accurately indicating the relative intensity of the reflected light. As a result, the depth sensor will not provide a correct indication of distance.

SUMMARY

Certain embodiments of the inventive concept are directed to provide a pixel circuit that is able to generate an analog signal faithfully reflecting a distance to an object under any ambient light condition. Other embodiments are directed to provide a depth sensor including this type of pixel circuit.

According to one embodiment of the inventive concept, a pixel circuit operating during a detection period and an output period following the detection period, wherein the pixel circuit is configured to operate in a first operating mode when an intensity of incident light is high and to operate in a second operating mode when the intensity of incident light is low, the pixel circuit comprising; a light receiving unit configured to generate charge in response to incident light, a signal generation unit configured to accumulate the charge in a floating diffusion node (FDN) in response to a transmission signal, a reset signal and a selection signal during the detection period, and configured to generate an analog signal having a level corresponding to a voltage apparent at the FDN during the output period, and a refresh transistor coupled between a supply voltage and the light receiving unit and configured to discharge the charge to the supply voltage in response to a refresh signal.

According to one embodiment of the inventive concept, a depth sensor, comprises; a pixel array including a plurality of pixel circuits arranged in a matrix, each of the plurality of pixel circuits being configured to generate an analog signal having a level corresponding to an intensity of incident light, a control unit configured to provide each of the plurality of pixel circuits with a transmission signal, a reset signal, a selection signal and control each of the plurality of pixel circuits to operate in a first operating mode when the intensity of incident light is high and in a second operating mode when the intensity of incident light is low, wherein the first operating mode and the second operating mode include a detection period and an output period following the detection period, and an analog digital conversion unit configured to convert the analog signal received from each of the plurality of pixel circuits into a digital signal, wherein each of the plurality of pixel circuits comprises; a light receiving unit configured to generate charge in response to the incident light, a signal generation unit configured to accumulate the charge in a floating diffusion node (FDN) in response to the transmission signal, reset signal and selection signal during the detection period, and configured to generate an analog signal having a level corresponding to a voltage apparent at the FDN during the output period, and a refresh transistor coupled between a supply voltage and the light receiving unit and configured to discharge the charge to the supply voltage in response to the refresh signal.

According to one embodiment of the inventive concept, a method of operating a depth sensor including a pixel circuit comprises: receiving incident light at the pixel circuit, determining whether an intensity of the incident light is high or low, providing the pixel circuit with a transmission signal, a reset signal, a selection signal and a refresh signal to operate the pixel circuit in a first operating mode when the intensity of incident light is high and in a second operating mode when the intensity of incident light is low, wherein the first operating mode and the second operating mode include a detection period and an output period following the detection period, during the detection period and while operating in the first operating mode, accumulating a first portion of charge stored in the floating diffusion node (FDN), and then discharging a remaining second portion of the charge stored in the FDN to a supply voltage, and during the detection period and while operating in the second operating mode, accumulating the charge in the FDN and then preventing discharge of the charge to the supply voltage.

BRIEF DESCRIPTION OF THE DRAWINGS

Illustrative, non-limiting embodiments will be more clearly understood from the following detailed description in conjunction with the accompanying drawings.

DETAILED DESCRIPTION

Figure 1:
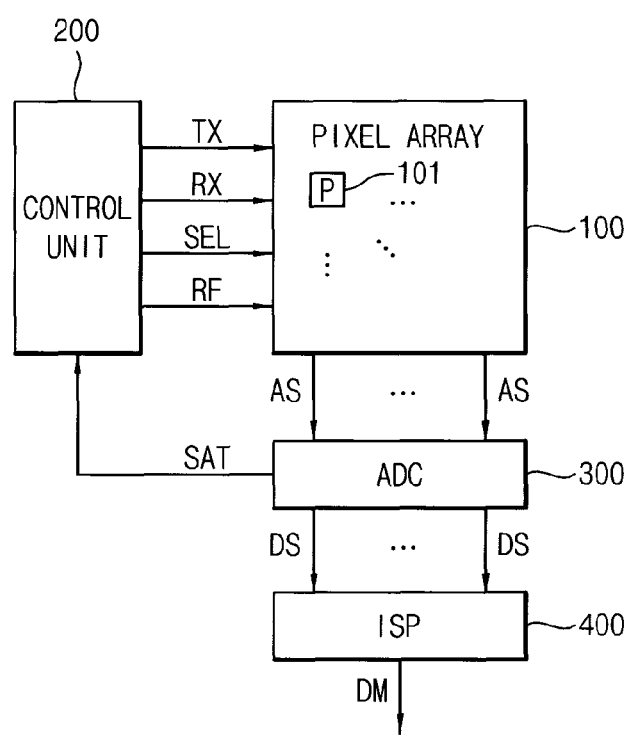
FIG. 1 is a block diagram illustrating a depth sensor according to embodiments.

Embodiments of the inventive concept will now be described in some additional detail with reference to the accompanying drawings. The inventive concept may, however, be embodied in many different forms and should not be construed as being limited to only the illustrated embodiments. Rather, the embodiments are provided so that this disclosure will be thorough and complete, and will fully convey the scope of the inventive concept to those skilled in the art. Throughout the written description and drawings, like reference number and labels are used to denote like or similar elements and/or features.

It will be understood that, although the terms first, second, etc. may be used herein to describe various elements, these elements should not be limited by these terms. These terms are used to distinguish one element from another. For example, a first element could be termed a second element, and, similarly, a second element could be termed a first element, without departing from the scope of the inventive concept. As used herein, the term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between," "adjacent" versus "directly adjacent," etc.).

The terminology used herein is for the purpose of describing particular embodiments and is not intended to be limiting of the inventive concept. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this inventive concept belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

FIG. (FIG.) 1 is a block diagram of a depth sensor that may incorporate a pixel circuit according to an embodiment of the inventive concept.

Referring to FIG. 1, a depth sensor 10 generally comprises a pixel array 100, a control unit 200 and an analog-digital conversion unit ADC 300.

The pixel array 100 includes a plurality of pixel circuits (P) 101 arranged in a matrix. Each of the plurality of pixel circuits 101 detects incident light and generates an analog signal (AS) having a magnitude corresponding to the intensity of the incident light.

The control unit 200 provides each of the plurality of pixel circuits 101 with a transmission signal (TX), a reset signal (RX), a selection signal (SEL) and a refresh signal (RF) to control each of the plurality of pixel circuits 101.

During a detection period, each of the plurality of pixel circuits 101 generates charge in response to the incident light and accumulates the charge in a floating diffusion node based on the control state of the transmission signal (TX), reset signal (RX) and refresh signal (RF). During an output period, the control unit 200 selects one of a plurality of rows from the pixel array 100 in a consecutive order using the selection signal SEL, and pixel circuits 101 included in a selected row generate the analog signal (AS) having a magnitude corresponding to the charge accumulated at the floating diffusion node.

The analog digital conversion unit 300 respectively converts the analog signal (AS) received from each one of the plurality of pixel circuits 101 into a corresponding digital signal (DS).

The depth sensor 10 may further include an image signal processor ISP 400. The image signal processor 400 may generate a depth map (DM) which may be understood as an image data field representing the distance between the depth sensor 10 and the target object. The depth map (DM) may be derived from the digital signal (DS). When the depth sensor 10 includes the image signal processor 400, the depth sensor 10 may be embodied as a system-on-chip (SoC).

The depth sensor 10 of FIG. 1 is assumed to use a time of flight (TOF) method for determining the distance to the target object and providing relevant "distance information" (i.e., data indicating the distance). As noted above, the TOF method begins when the depth sensor 10 emits "source light" towards the target object. A portion of the emitted source light reflected from the target object ("reflected light") is detected by the depth sensor. Then, the time between source light emission and reflected light detection may be used to determine (e.g., calculate) the distance to the target object. The light source (e.g., a light emitting diode or LED) may be included in the depth sensor 10 or may be provided external to the depth sensor 10.

The "incident light" transmitted from the target object to the depth sensor 10 during the distance determination process includes the reflected light (i.e., incident light originating from the light source associated with the depth sensor) and "ambient light" (i.e., environmental light originating from a source other than the light source, like the sun). The ambient light may be compensated to a certain degree by use of a voltage offset in the operation of the plurality of pixel circuits 101. However, if the ambient light is relatively high, the floating diffusion node of each of the plurality of pixel circuits 101 may be saturated by charge generated due to the intense ambient light, such that the depth sensor 10 may not be able to generate the analog signal (AS) corresponding to the reflected light.

In view of the this issue, the depth sensor 10 may be operated in one of multiple operating modes that vary with the intensity of the ambient light. For example, the depth sensor 10 may operate in a first operation mode when the intensity of the ambient light is relatively high, and a second operation mode when the intensity of the ambient light is relatively low.

The analog digital conversion unit 300 may then be used to compare the level of the analog signal (AS) with a reference value to generate a saturation signal (SAT) provided to the control unit 200. For example, when the level of the analog signal (AS) is greater than or equal to the reference value, the analog digital conversion unit 300 may determine that the floating diffusion node is saturated and generate the saturation signal (SAT) at a logically "high" level. On the other hand, when the magnitude of the analog signal (AS) is less than the reference value, the analog digital conversion unit 300 may determine that the floating diffusion node is not saturated and generate the saturation signal (SAT) at a logically "low" level.

In turn, the control unit 200 will operate in the first operation mode when the saturation signal (SAT) is high, and in the second operation mode when the saturation signal (SAT) is low.

Figure 2:
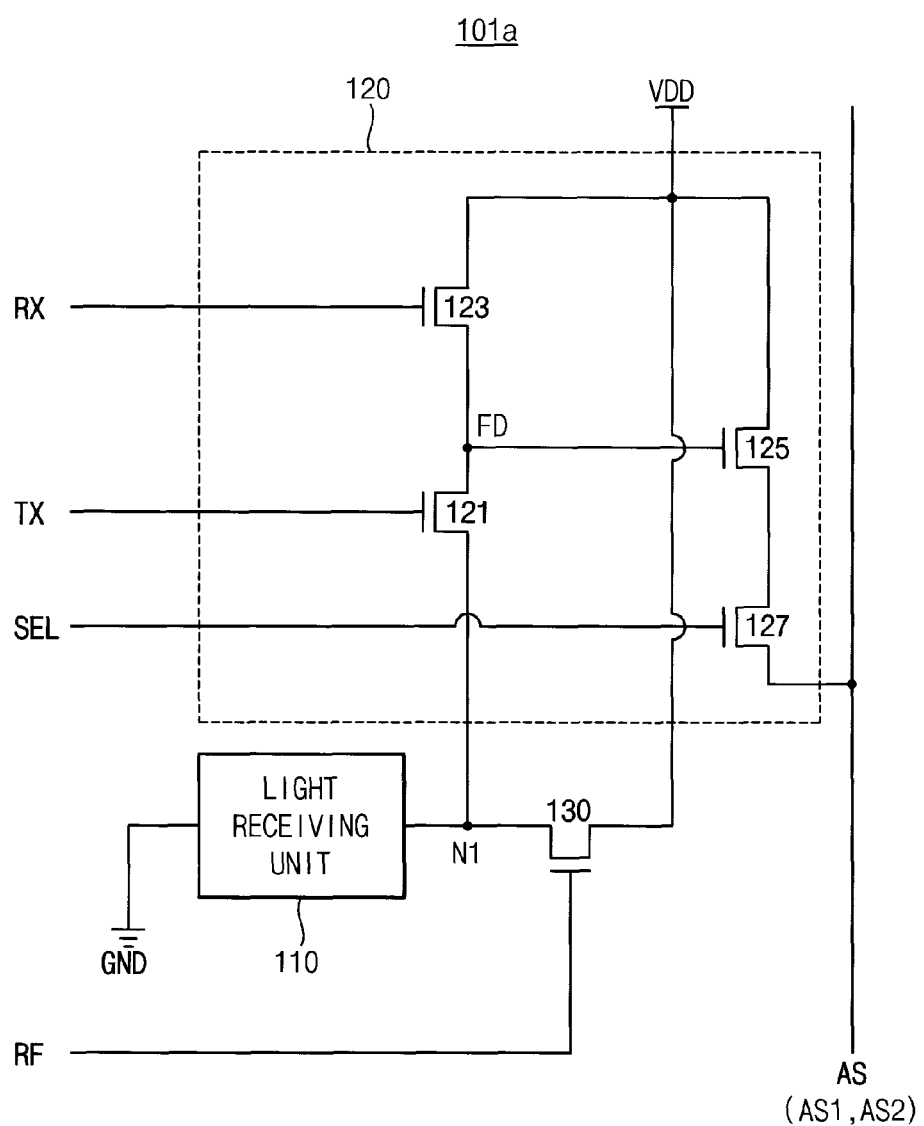
FIG. 2 is a block diagram illustrating an example of a pixel circuit included in a depth sensor of FIG. 1.

Exemplary operation of a pixel circuit 101a of the pixel array 100 under the control of the control unit 200 in the first operation mode and second operation mode will now be described in some additional detail with reference to FIGS. 1 and 2. FIG. 2 is a block diagram illustrating the pixel circuit 101a comprising a light receiving unit 110, a signal generation unit 120 and a refresh transistor 130.

The light receiving unit 110 generates charge in response to received incident light. For example, the light receiving unit 110 may absorb the incident light, generate charge corresponding to the intensity of the incident light, and provide the charge to a first node N1. Light receiving unit 110 may be implemented using a photo gate, or a photo diode.

The signal generation unit 120 is coupled between the light receiving unit 110 and a supply voltage VDD. The signal generation unit 120 transfers the charge generated by the light receiving unit 110, from the first node N1 to a floating diffusion node FD to accumulate the charge in the floating diffusion node FD based on the transmission signal (TX), the reset signal (RX) and the selection signal (SEL) during the detection period. The signal generation unit 120 generates the analog signal (AS) having a level (or magnitude) corresponding to a voltage of the floating diffusion node FD during the output period.

The refresh transistor 130 is coupled between the supply voltage VDD and the light receiving unit 110. The refresh transistor 130 discharges the charge from the first node N1 to the supply voltage VDD in response to the refresh signal (RF). For example, the refresh transistor 130 may turn ON to discharge the charge from the first node N1 to the supply voltage VDD when the refresh signal (RF) is high, and the refresh transistor 130 may turn OFF to prevent the charge from being discharged from the first node N1 to the supply voltage VDD when the refresh signal (RF) is low.

As illustrated in FIG. 2, the signal generation unit 120 may include a transmission transistor 121, a reset transistor 123, a drive transistor 125, and a selection transistor 127.

The transmission transistor 121 may include a source connected to the light receiving unit 110 at the first node N1, a drain connected to the floating diffusion node FD, and a gate receiving the transmission signal (TX).

The reset transistor 123 may include a source connected to the floating diffusion node FD, a drain connected to the supply voltage VDD, and a gate receiving the reset signal (RX).

The drive transistor 125 may include a source connected to a drain of the selection transistor 127, a drain connected to the supply voltage VDD, and a gate connected to the floating diffusion node FD.

The selection transistor 127 may include a source outputting the analog signal (AS), a drain connected to the source of the drive transistor 125, and a gate receiving the selection signal SEL.

Figure 3:
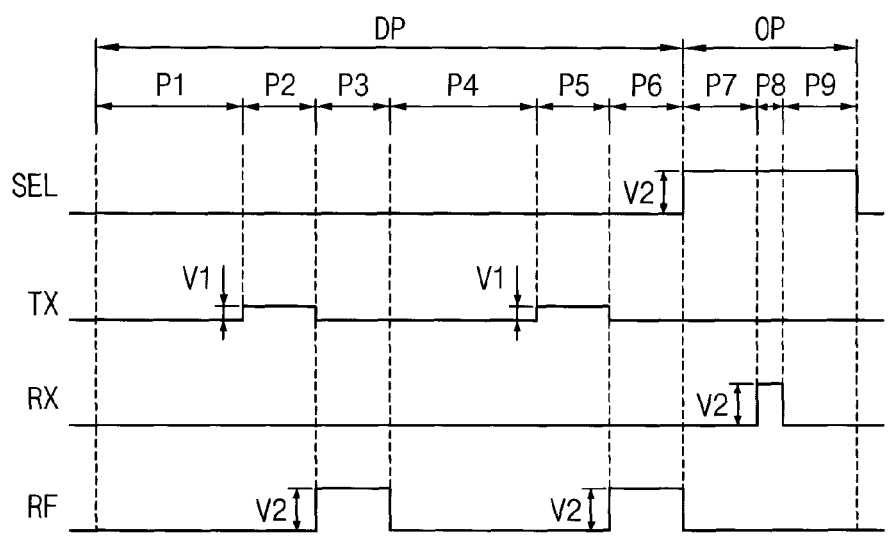
FIG. 3 is a timing diagram of a transmission signal, a reset signal, a selection signal, and a refresh signal that are provided from a control unit to a pixel array of FIG. 1 in a first operation mode.

FIG. 3 is a timing diagram illustrating an exemplary set of relationships between the transmission signal (TX), reset signal (RX), selection signal (SEL), and refresh signal (RF) as provided by the control unit 200 to the pixel array 100 of FIG. 1 during the first operation mode.

FIGS. 4A to 4I are voltage diagrams further illustrating changes in electric potential and corresponding charge flow with the pixel circuit of FIG. 2 during the first operation mode.

In FIGS. 4A to 4I, electric potentials of a gate RFG of the refresh transistor 130, a gate TG of the transmission transistor 121, a gate RG of the reset transistor 123, the first node N1 and the floating diffusion node FD are illustrated.

As described above, the control unit 200 and the pixel circuit 101a may operate in the first operation mode when an intensity of ambient light is relatively high.

Hereinafter, an operation of the pixel circuit 101a in the first operation mode will be described with reference to FIGS. 1, 2, 3 and 4A to 4I.

As illustrated in FIG. 3, one frame period may be divided into the detection period DP and the output period OP. The detection period DP and the output period OP may be determined based on a logic level of the selection signal SEL received from the control unit 200. That is, the selection signal SEL may be low during the detection period DP, and high level during the output period OP.

In the first operation mode, the control unit 200 provides the pixel circuit 101a with the selection signal (SEL) and the reset signal (RX) with inactivated states throughout the detection period DP, and provide the pixel circuit 101a with the transmission signal (TX) and the refresh signal (RF) with activated states in turn at least one time during the detection period DP. The activated state may be indicated by a high signal state, and the inactivated state may be indicated by a low signal state. In FIG. 3, the transmission signal (TX) and the refresh signal (RF) are activated in turn twice during the detection period DP as an example.

In the illustrated example, the detection period DP includes a first period P1, a second period P2, a third period P3, a fourth period P4, a fifth period P5, and a sixth period P6.

Figure 4A:
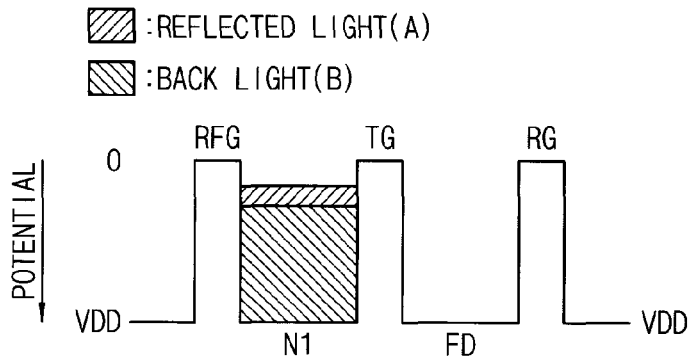
FIGS. 4A to 4I are diagrams for describing a change of an electrical potential and a flow of charge in a pixel circuit of FIG. 2 in a first operation mode.

FIG. 4A illustrates electric potentials and charge flow for the pixel circuit 101a during the first period P1 of the first operation mode.

Referring to FIG. 3, the transmission signal (TX), the reset signal (RX) and the refresh signal (RF) are low (e.g., 0V) during the first period P1. Therefore, the transmission transistor 121, reset transistor 123, and refresh transistor 130 are turned OFF, such that the charge generated by the light receiving unit 110 is stored in the first node N1.

As illustrated in FIG. 4A, an electric potential of the gate RFG of the refresh transistor 130, an electric potential of the gate TG of the transmission transistor 121, and an electric potential of the gate RG of the reset transistor 123 are 0V. Both charge A and change B are generated by the light receiving unit 110 and stored in the first node N1.

As described above, the incident light includes both reflected light and ambient light. Thus, charge A in the working examples is assumed to be generated due to the reflected light, while charge B is assumed to be generated due to the ambient light, although in practical application charge A cannot be distinguished from charge B. Nonetheless, charge A and charge B are separately illustrated in FIGS. 4A through 4I for clarity of teaching.

Figure 4B:
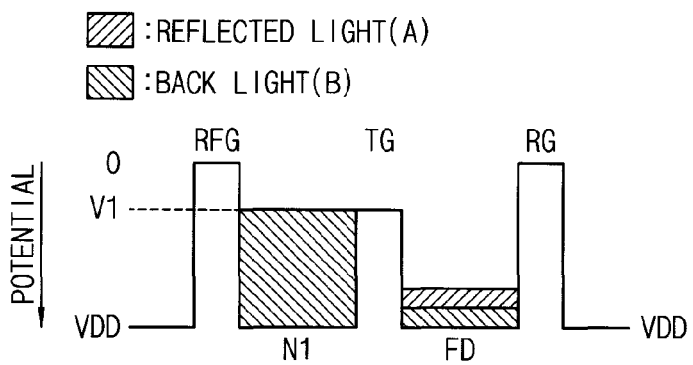

FIG. 4B illustrates electric potentials and charge flow for the pixel circuit 101a during the second period P2 in the first operation mode.

Referring to FIG. 3, the reset signal (RX) and the refresh signal (RF) are inactivated and the transmission signal (TX) is activated to a first voltage V1 during the second period P2. The level of the first voltage V1 is less than the supply voltage VDD. Therefore, the reset transistor 123 and refresh transistor 130 are turned OFF, and the transmission transistor 121 are weakly turned ON, such that the transmission transistor 121 transfers a portion of the charge stored at the first node N1 to the floating diffusion node FD.

As illustrated in FIG. 4B, an electric potential of the gate RFG of the refresh transistor 130 and an electric potential of the gate RG of the reset transistor 123 are 0V, and an electric potential of the gate TG of the transmission transistor 121 becomes the first voltage V1. As such, a portion of the charge stored at the first node N1 is transferred to the floating diffusion node FD.

Figure 4C:
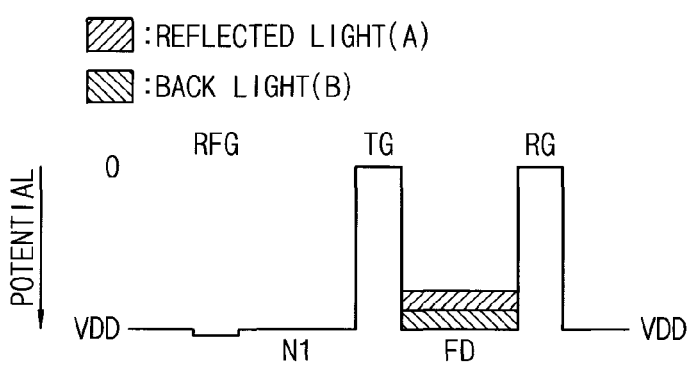

FIG. 4C illustrates electric potentials and charge flow for the pixel circuit 101a during the third period P3 in the first operation mode.

Referring to FIG. 3, the transmission signal (TX) and the reset signal (RX) are inactivated and the refresh signal (RF) is activated to a second voltage V2 during the third period P3. The level of the second voltage V2 is greater than the first voltage V1. For example, the second voltage V2 may be the supply voltage VDD. Therefore, the transmission transistor 121 and reset transistor 123 are turned OFF, and the refresh transistor 130 is strongly turned ON such that the refresh transistor 130 discharges the remaining charge stored at the first node N1 to the supply voltage VDD.

As illustrated in FIG. 4C, an electric potential of the gate TG of the transmission transistor 121 and an electric potential of the gate RG of the reset transistor 123 are 0V, and an electric potential of the gate RFG of the refresh transistor 130 becomes the supply voltage VDD. As such, the remaining charge stored at the first node N1 is discharged to the supply voltage VDD while the charge accumulated in the floating diffusion node FD is retained.

Figure 4D:
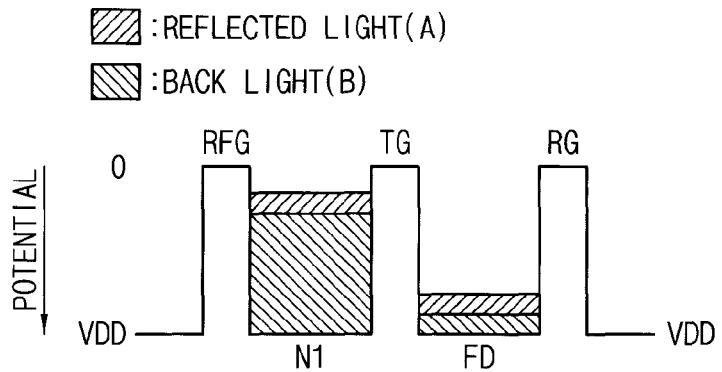

FIG. 4D illustrates electric potentials and charge flow for the pixel circuit 101a during the fourth period P4 in the first operation mode.

Referring to FIG. 3, the transmission signal (TX), the reset signal (RX) and the refresh signal (RF) are inactivated during the fourth period P4. Therefore, the transmission transistor 121, reset transistor 123, and refresh transistor 130 are turned OFF, such that the charge generated by the light receiving unit 110 is stored in the first node N1.

As illustrated in FIG. 4D, an electric potential of the gate RFG of the refresh transistor 130, an electric potential of the gate TG of the transmission transistor 121, and an electric potential of the gate RG of the reset transistor 123 are 0V. Therefore, charge A and B generated by the light receiving unit 110 are stored at the first node N1 while the charge accumulated in the floating diffusion node FD is maintained.

Figure 4E:
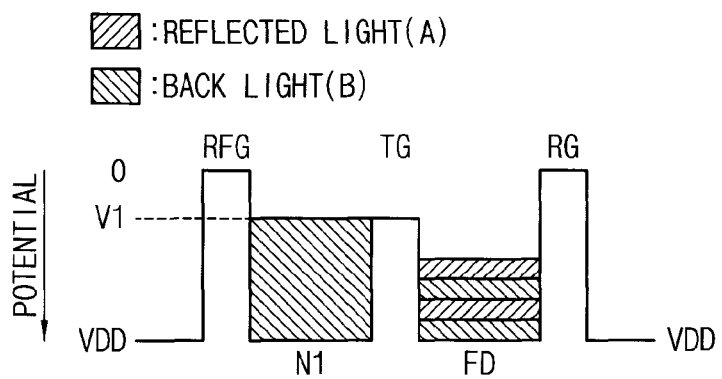

FIG. 4E illustrates electric potentials and charge flows for the pixel circuit 101a during the fifth period P5 in the first operation mode.

Referring to FIG. 3, the reset signal (RX) and the refresh signal (RF) are inactivated and the transmission signal (TX) is activated to the first voltage V1 during the fifth period P5. Therefore, the reset transistor 123 and refresh transistor 130 are turned OFF, and the transmission transistor 121 are weakly turned ON such that the transmission transistor 121 transfer a portion of the charge stored at the first node N1 to the floating diffusion node FD.

As illustrated in FIG. 4E, an electric potential of the gate RFG of the refresh transistor 130 and an electric potential of the gate RG of the reset transistor 123 are 0V, and an electric potential of the gate TG of the transmission transistor 121 becomes the first voltage V1. As such, a portion of the charge stored at the first node N1 are transferred to the floating diffusion node FD. Therefore, both charge transferred from the first node N1 to the floating diffusion node FD during the second period P2 and charge transferred from the first node N1 to the floating diffusion node FD during the fifth period P5 are accumulated in the floating diffusion node FD.

Figure 4F:
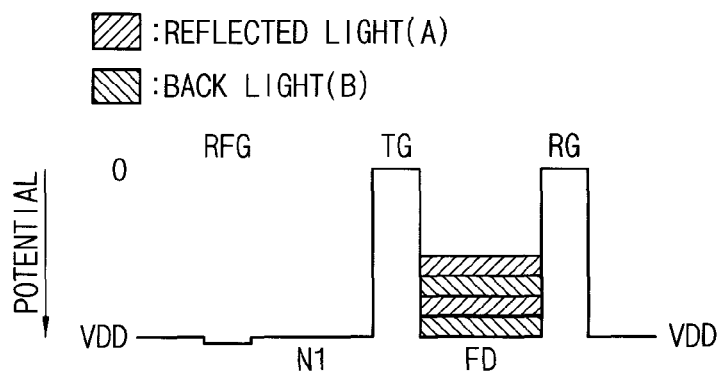

FIG. 4F illustrates electric potentials and charge flows for the pixel circuit 101a during the sixth period P6 in the first operation mode.

Referring to FIG. 3, the transmission signal (TX) and the reset signal (RX) are inactivated and the refresh signal (RF) is activated to the second voltage V2 during the sixth period P6. Therefore, the transmission transistor 121 and the reset transistor 123 are turned OFF, and the refresh transistor 130 is strongly turned ON, such that the refresh transistor 130 may discharge the remaining charge stored at the first node N1 to the supply voltage VDD.

As illustrated in FIG. 4F, an electric potential of the gate TG of the transmission transistor 121 and an electric potential of the gate RG of the reset transistor 123 are 0V, and an electric potential of the gate RFG of the refresh transistor 130 becomes the supply voltage VDD. As such, the remaining charge stored at the first node N1 is discharged to the supply voltage VDD while the charge accumulated in the floating diffusion node FD is retained.

During the first operation mode, the control unit 200 provides the pixel circuit 101a with the transmission signal (TX) and refresh signal (RF) having an inactivated state throughout the output period OP, provides the pixel circuit 101a with the selection signal SEL having an activated state throughout the output period OP, and provides the pixel circuit 101a with the reset signal (RX) that is activated during a portion of the output period OP.

The output period OP may include a seventh period P7, an eighth period P9, and a ninth period P9.

Figure 4G:
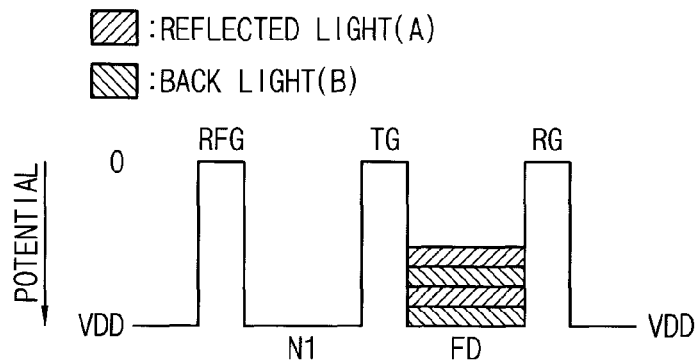

FIG. 4G illustrates electric potentials and charge flow for the pixel circuit 101a during the seventh period P7 in the first operation mode.

Referring to FIG. 3, the transmission signal (TX), the reset signal (RX) and the refresh signal (RF) are inactivated during the seventh period P7. Therefore, the transmission transistor 121, reset transistor 123, and refresh transistor 130 are turned OFF, such that the charge accumulated in the floating diffusion node FD is retained.

As illustrated in FIG. 4G, an electric potential of the gate RFG of the refresh transistor 130, an electric potential of the gate TG of the transmission transistor 121, and an electric potential of the gate RG of the reset transistor 123 are 0V. As such, the charge accumulated in the floating diffusion node FD is retained.

In addition, the selection signal SEL is activated to the second voltage V2 during the seventh period P7, so that the selection transistor 127 is turned ON. Therefore, the drive transistor 125 may generate a first analog signal (AS1) having a level corresponding to a voltage apparent at the floating diffusion node FD which is proportional to the quantity of charge accumulated in the floating diffusion node FD, and the selection transistor 127 may output the first analog signal (AS1) to the analog digital conversion unit 300.

Figure 4H:
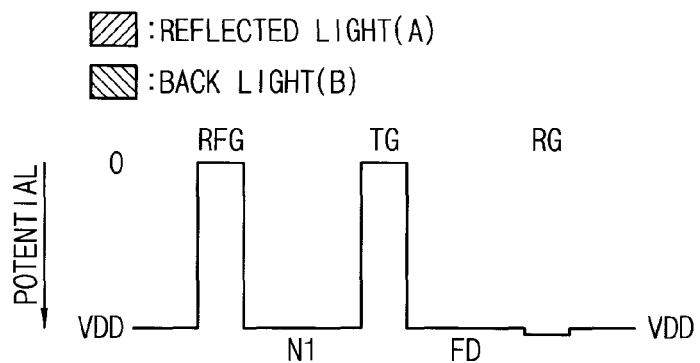

FIG. 4H illustrates electric potentials and charge flow for the pixel circuit 101a during the eighth period P8 in the first operation mode.

Referring to FIG. 3, the transmission signal (TX) and the refresh signal (RF) are inactivated and the reset signal (RX) is activated to the second voltage V2 during the eighth period P8. Therefore, the transmission transistor 121 and refresh transistor 130 are turned OFF, and the reset transistor 123 is strongly turned ON, such that the reset transistor 123 may discharge the charge accumulated in the floating diffusion node FD to the supply voltage VDD. As such, the floating diffusion node FD is placed in a reset state characterized by an absence of charge.

As illustrated in FIG. 4H, an electric potential of the gate TG of the transmission transistor 121 and an electric potential of the gate RFG of the refresh transistor 130 are 0V, and an electric potential of the gate RG of the reset transistor 123 becomes the supply voltage VDD. As such, the charge accumulated in the floating diffusion node FD is discharged to the supply voltage VDD.

Figure 4I:
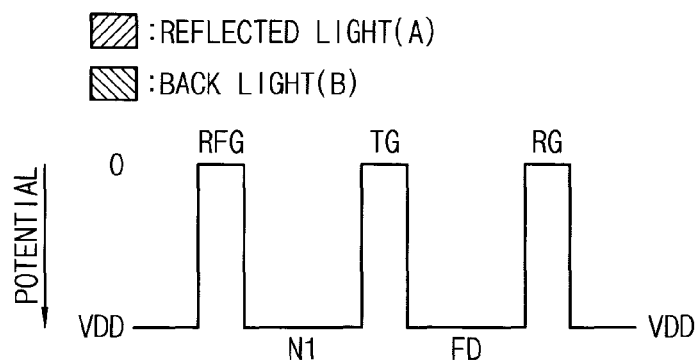

FIG. 4I illustrates electric potentials and charge flow for the pixel circuit 101a during the ninth period P9 in the first operation mode.

Referring to FIG. 3, the transmission signal (TX), the reset signal (RX) and the refresh signal (RF) are inactivated during the ninth period P9. Therefore, the transmission transistor 121, reset transistor 123, and refresh transistor 130 are turned OFF, such that the floating diffusion node FD is retained in the reset state.

As illustrated in FIG. 4I, an electric potential of the gate RFG of the refresh transistor 130, an electric potential of the gate TG of the transmission transistor 121, and an electric potential of the gate RG of the reset transistor 123 are 0V. As such, the floating diffusion node FD is maintained in the reset state.

In addition, the selection signal SEL is maintained in an activated state in the ninth period P9, so that the selection transistor 127 is turned ON. Therefore, the drive transistor 125 may generate a second analog signal (AS2) having a magnitude corresponding to a voltage of the floating diffusion node FD in the reset state, and the selection transistor 127 may output the second analog signal AS2 to the analog digital conversion unit 300.

As described above, during the first operation mode, the pixel circuit 101a may accumulate a (first) portion of charge generated by the light receiving unit 110 to the floating diffusion node FD and discharge a remaining (second) portion of the charge to the supply voltage VDD at least once without saturating the floating diffusion node FD during the detection period DP, and consecutively output the first analog signal (AS1) having a level corresponding to a voltage apparent at the floating diffusion node FD which is proportional to the charge accumulated at the floating diffusion node FD, and the second analog signal (AS2) having a level corresponding to a voltage apparent at the floating diffusion node FD in the reset state during the output period OP.

In FIG. 3, the transmission signal (TX) and the refresh signal (RF) are activated in twice during the detection period DP in the first operation mode, as an example. However, the number of activations for the transmission signal (TX) and refresh signal (RF) during the detection period DP in the first operation mode may be adjusted according to the intensity of the ambient light.

For example, as the intensity of ambient light increases, the quantity of charge generated by the light receiving unit 110 per unit of time increases. Therefore, when the intensity of ambient light is relatively high, the first node N1 may be saturated during the first period P1 and/or the fourth period P4 described above, such that charge stored at the first node N1 is transferred to the floating diffusion node FD through the transmission transistor 121. Under such circumstances, the control unit 200 may reduce the length of the first period P1 and/or the fourth period P4, and increase the number of activations for the transmission signal (TX) and refresh signal (RF) during the detection period DP in the first operation mode to accumulate a portion of charge generated by the light receiving unit 110 to the floating diffusion node FD without saturating the floating diffusion node FD during the detection period DP.

Figure 5:
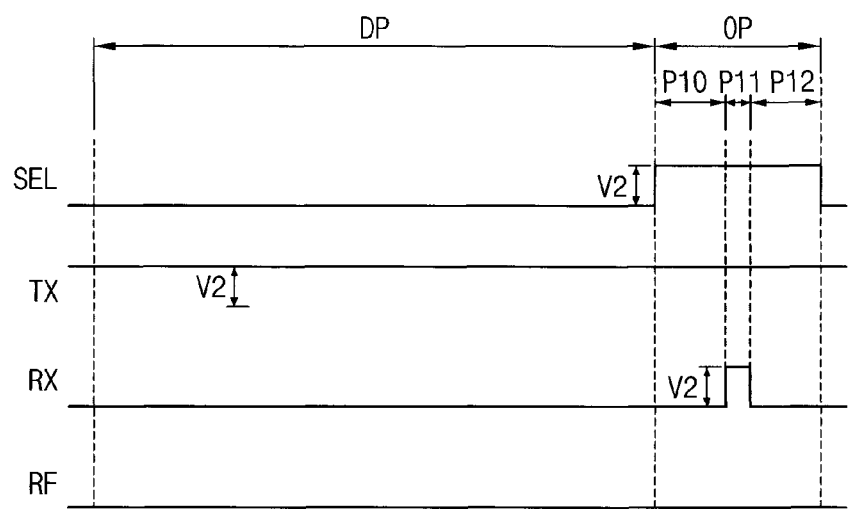
FIG. 5 is a timing diagram of a transmission signal, a reset signal, a selection signal, and a refresh signal that are provided from a control unit to a pixel array of FIG. 1 in a second operation mode.

FIG. 5 is a timing diagram illustrating an exemplary set of relationships for the transmission signal (TX), reset signal (RX), selection signal (SEL), and refresh signal (RF) as provided by the control unit 200 to the pixel array 100 of FIG. 1 during the second operation mode.

Figure 6A:
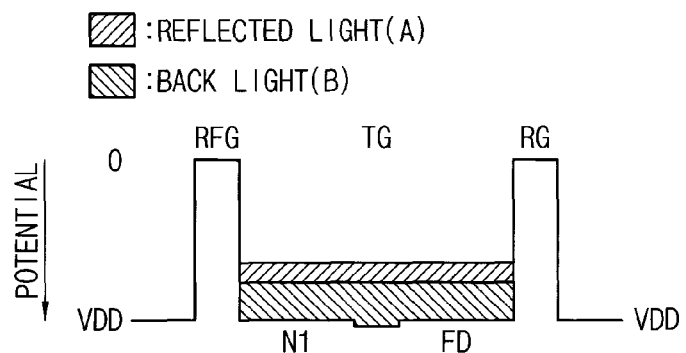
FIGS. 6A, 6B and 6C are diagrams for describing a change of an electrical potential and a flow of charge in a pixel circuit of FIG. 2 in a second operation mode.
Figure 6B:
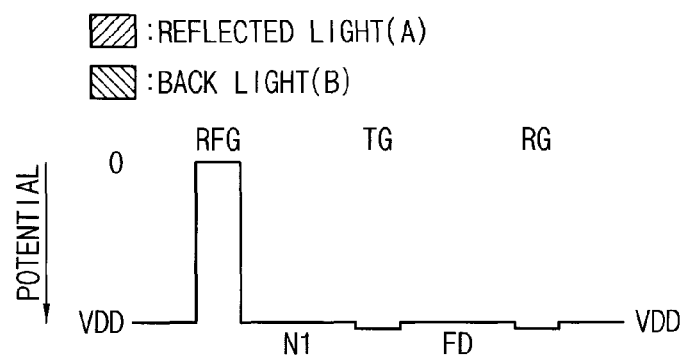
Figure 6C:
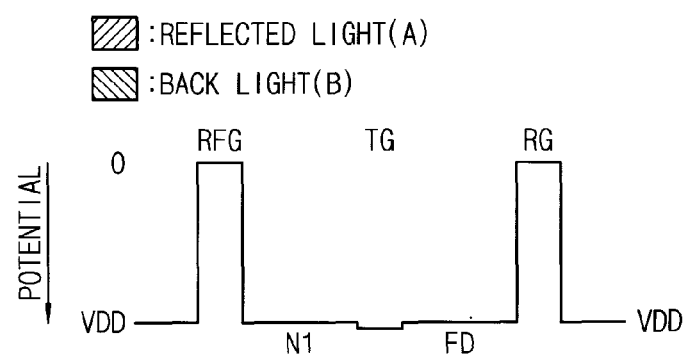

FIGS. 6A, 6B and 6C are voltage diagrams illustrating changes in electrical potential and charge flow for the pixel circuit of FIG. 2 in a second operation mode.

As described above, the control unit 200 and the pixel circuit 101a may operate in the second operation mode when an intensity of the ambient light is relatively low.

Hereinafter, operation of the pixel circuit 101a in the second operation mode will be described with reference to FIGS. 1, 2, 5, 6A, 6B and 6C.

As illustrated in FIG. 5, one frame period may be divided into the detection period DP and the output period OP. The detection period DP and the output period OP may be determined based on the state the selection signal (SEL) received from the control unit 200. That is, a low selection signal (SEL) may be provide during the detection period DP, and a high selection signal (SEL) may be provided during the output period OP.

In the second operation mode, the control unit 200 may provide the pixel circuit 101a with the selection signal (SEL), reset signal (RX) and refresh signal (RF) having an inactivated state throughout the detection period DP, and provide the pixel circuit 101a with the transmission signal (TX) that is activated to the second voltage V2 throughout the detection period DP. The second voltage V2 may be the supply voltage VDD. Here again, the activated state may be indicated by a logically "high" level, and the inactivated state may indicated by a logically "low" level.

FIG. 6A illustrates electric potentials and charge flow for the pixel circuit 101a during the detection period DP in the second operation mode.

Referring to FIG. 5, the reset signal (RX) and refresh signal (RF) are inactivated, and the transmission signal (TX) is activated to the second voltage V2 during the detection period DP. Therefore, the reset transistor 123 and refresh transistor 130 are turned OFF, and the transmission transistor 121 is strongly turned ON. As such, the transmission transistor 121 may continuously accumulate charge generated by the light receiving unit 110 to the floating diffusion node FD while the reset transistor 123 and refresh transistor 130 prevent the charge generated by the light receiving unit 110 from being discharged to the supply voltage VDD.

As illustrated in FIG. 6A, an electric potential of the gate RFG of the refresh transistor 130 and an electric potential of the gate RG of the reset transistor 123 are 0V, and an electric potential of the gate TG of the transmission transistor 121 becomes the supply voltage VDD. As such, charge A and charge B generated by the light receiving unit 110 are continuously accumulated across the first node N1 and the floating diffusion node FD during the detection period DP.

During the second operation mode, the control unit 200 provide the pixel circuit 101a with the refresh signal (RF) having an inactivated state throughout the output period OP, provide the pixel circuit 101a with the selection signal (SEL) and the transmission signal (TX) having an activated state throughout the output period OP, and provide the pixel circuit 101a with the reset signal (RX) that is activated during a portion of the output period OP.

The output period OP may include a tenth period P10, an eleventh period P11, and a twelfth period P12.

FIG. 6A represents electric potentials and charge flow for the pixel circuit 101a during the tenth period P10 in the second operation mode.

Referring to FIG. 5, during the tenth period P10, the transmission signal (TX), reset signal (RX) and refresh signal (RF) are kept in the same state as in the detection period DP. Therefore, the charge accumulated across the first node N1 and the floating diffusion node FD are maintained.

As illustrated in FIG. 6A, an electric potential of the gate RFG of the refresh transistor 130 and an electric potential of the gate RG of the reset transistor 123 are 0V, and an electric potential of the gate TG of the transmission transistor 121 becomes the supply voltage VDD. As such, the charge accumulated over the first node N1 and the floating diffusion node FD are maintained.

In addition, the selection signal (SEL) is activated to the second voltage V2 during the tenth period P10, so that the selection transistor 127 is turned ON. Therefore, the drive transistor 125 may generate a first analog signal (AS1) having a magnitude corresponding to a voltage of the floating diffusion node FD, which is proportional to the charge accumulated in the floating diffusion node FD, and the selection transistor 127 may output the first analog signal (AS1) to the analog digital conversion unit 300.

FIG. 6B illustrates electric potentials and charge flow for the pixel circuit 101a during the eleventh period P11 in the second operation mode.

Referring to FIG. 5, the refresh signal (RF) is inactivated, and the transmission signal (TX) and reset signal (RX) are activated to the second voltage V2 during the eleventh period P11. Therefore, the refresh transistor 130 is turned OFF, and the transmission transistor 121 and reset transistor 123 are strongly turned ON, such that the reset transistor 123 may discharge the charge accumulated across the first node N1 and the floating diffusion node FD to the supply voltage VDD. As such, the floating diffusion node FD may be in the reset state.

As illustrated in FIG. 6B, an electric potential of the gate RFG of the refresh transistor 130 are 0V, and an electric potential of the gate TG of the transmission transistor 121 and an electric potential of the gate RG of the reset transistor 123 become the supply voltage VDD. As such, the charge accumulated over the first node N1 and the floating diffusion node FD are discharged to the supply voltage VDD.

FIG. 6C illustrates electric potentials and charge flow for the pixel circuit 101a during the twelfth period P12 in the second operation mode.

Referring to FIG. 5 the reset signal (RX) and the refresh signal (RF) are inactivated, and the transmission signal (TX) are activated to the second voltage V2 during the twelfth period P12. Therefore, the reset transistor 123 and the refresh transistor 130 are turned OFF and the transmission transistor 121 is strongly turned ON such that the floating diffusion node FD is maintained in the reset state.

As illustrated in FIG. 6C, an electric potential of the gate RFG of the refresh transistor 130 and an electric potential of the gate RG of the reset transistor 123 are 0V, and an electric potential of the gate TG of the transmission transistor 121 becomes the supply voltage VDD. As such, the floating diffusion node FD is maintained in the reset state.

In addition, the selection signal (SEL) is maintained in an activated state during the twelfth period P12, so that the selection transistor 127 is turned ON. Therefore, the drive transistor 125 may generate a second analog signal (AS2) having a level corresponding to a voltage of the floating diffusion node FD in the reset state, and the selection transistor 127 may output the second analog signal (AS2) to the analog digital conversion unit 300.

When an intensity of the ambient light is relatively low, the first node N1 and the floating diffusion node FD will not be saturated although charge generated by the light receiving unit 110 are continuously accumulated over the first node N1 and the floating diffusion node FD throughout the detection period DP. Therefore, as described above, in the second operation mode, the pixel circuit 101a may continuously accumulate charge generated by the light receiving unit 110 to the floating diffusion node FD without saturating the floating diffusion node FD during the detection period DP, and consecutively output the first analog signal AS1 having a level corresponding to a voltage apparent at the floating diffusion node FD which is proportional to the charge accumulated in the floating diffusion node FD, and the second analog signal (AS2) having a level corresponding to a voltage apparent at the floating diffusion node FD in the reset state during the output period OP.

As described above, when an intensity of the ambient light is relatively high, the pixel circuit 101a operates in the first operation mode in which the pixel circuit 101a accumulates a portion of charge generated by the light receiving unit 110 to the floating diffusion node FD and discharge rest of the charge to the supply voltage VDD at least one time during the detection period DP. Alternatively, when an intensity of the ambient light is relatively low, the pixel circuit 101a operates in the second operation mode in which the pixel circuit 101a continuously accumulates charge generated by the light receiving unit 110 to the floating diffusion node FD without discharging any of the charge to the supply voltage VDD during the detection period DP.

Therefore, the pixel circuit 101a may be able to generate the first analog signal AS1 representing a distance from the depth sensor 10 to an object under any ambient light condition.

Figure 7:
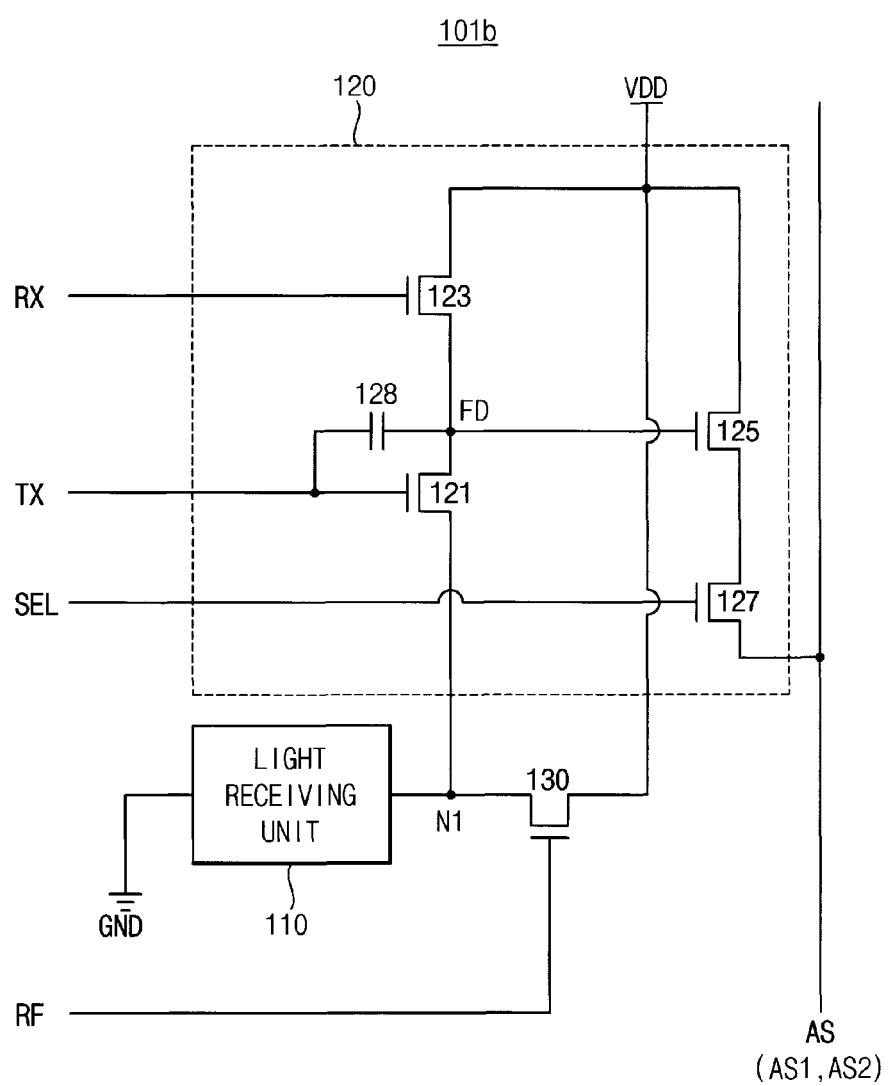
FIG. 7 is a block diagram illustrating another example of a pixel circuit included in a depth sensor of FIG. 1.

FIG. 7 is a block diagram illustrating another pixel circuit consistent with certain embodiments of the inventive concept that may be included in the depth sensor of FIG. 1.

Referring to FIG. 7, a pixel circuit 101b comprises a light receiving unit 110, a signal generation unit 120 and a refresh transistor 130.

Comparing the pixel circuit 101b of FIG. 7 with the pixel circuit 101a of FIG. 2, the signal generation unit 120 of the pixel circuit 101b of FIG. 7 additionally includes a boosting capacitor 128. Hence, common features and elements, as well as their structure and operation, as between the pixel circuit 101a of FIG. 2 and the pixel circuit 101b of FIG. 7 will be omitted from the description that follows to avoid undue repetition.

The boosting capacitor 128 may have a first electrode connected to the floating diffusion node FD and a second electrode receiving the transmission signal (TX). The boosting capacitor 128 may boost a voltage of the floating diffusion node FD using a boosting effect when the transmission signal (TX) is activated. If the voltage of the floating diffusion node FD is boosted when the transmission signal (TX) is activated, the charge stored in the first node N1 may be rapidly transferred to the floating diffusion node FD through the transmission transistor 121, and the charge accumulated in the floating diffusion node FD may be effectively prevented from being moved back to the first node N1.

As in the same case of the pixel circuit 101a of FIG. 2, the pixel circuit 101b of FIG. 7 may operate in the first operation mode using signals illustrated in FIG. 3, and operate in the second operation mode using signals illustrated in FIG. 5.

FIGS. 8A to 8I are voltage diagrams describing changes in electrical potential and charge flow for the pixel circuit of FIG. 7 in a first operation mode. That is, FIGS. 8A to 8I illustrate change in electrical potential and charge flow for the pixel circuit 101b of FIG. 7 during the first period P1 through the ninth period P9, respectively, in the first operation mode.

Hereinafter, an operation of the pixel circuit 101b in the first operation mode will be described with reference to FIGS. 1, 3, 7 and 8A to 8I.

The boosting capacitor 128 receives the transmission signal (TX) at the second electrode, so that the boosting capacitor 128 may not boost the voltage of the floating diffusion node FD when the transmission signal (TX) is inactivated. Therefore, an operation of the pixel circuit 101b of FIG. 7 is substantially the same as the pixel circuit 101a of FIG. 2 during the first period P1, the third period P3, the fourth period P4, the sixth period P6, the seventh period P7, the eighth period P8, and the ninth period P9 in which the transmission signal (TX) is inactivated. Therefore, detailed description about FIGS. 8A, 8C, 8D, 8F, 8G, 8H, and 8I will be omitted here.

Referring to FIG. 3, the reset signal (RX) and refresh signal (RF) are inactivated and the transmission signal (TX) is activated to the first voltage V1 during the second period P2 and the fifth period P5. The magnitude of the first voltage V1 is less than the supply voltage VDD. Therefore, the reset transistor 123 and the refresh transistor 130 are turned OFF, and the transmission transistor 121 is weakly turned ON, such that the transmission transistor 121 may transfer a portion of the charge, which are stored in the first node N1, to the floating diffusion node FD.

Figure 8A:
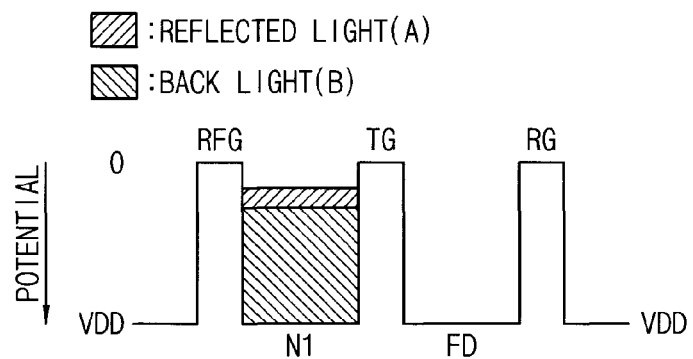
FIGS. 8A to 8I are diagrams for describing a change of an electrical potential and a flow of charge in a pixel circuit of FIG. 7 in a first operation mode.
Figure 8B:
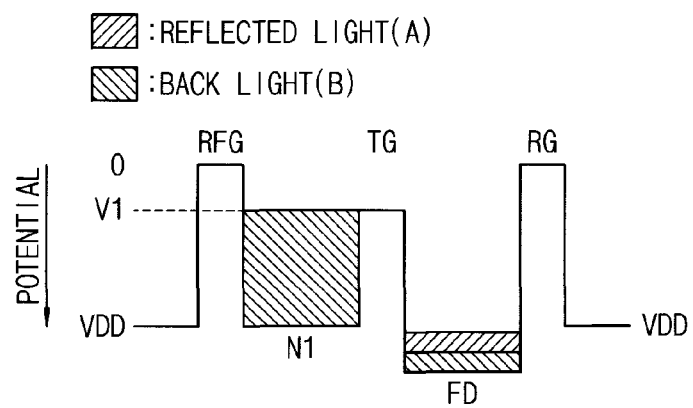
Figure 8C:
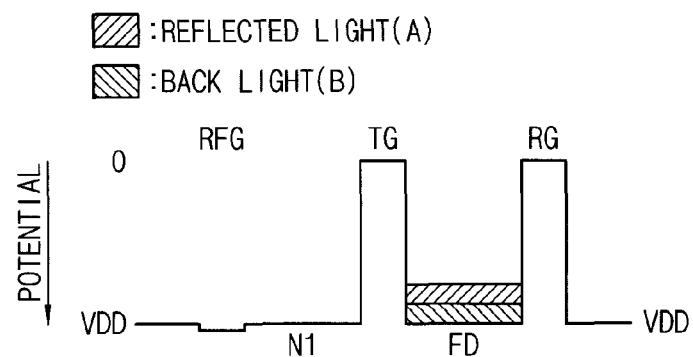
Figure 8D:
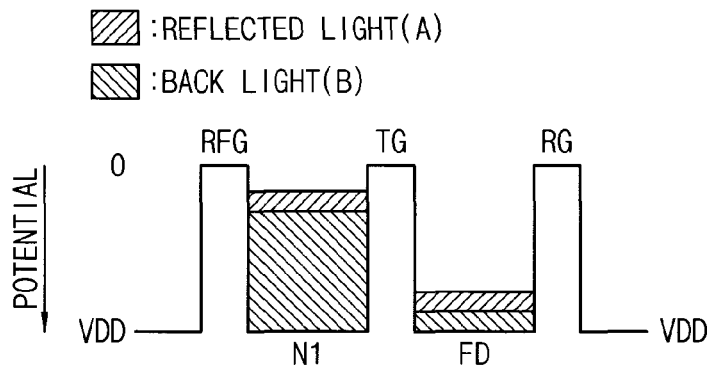
Figure 8E:
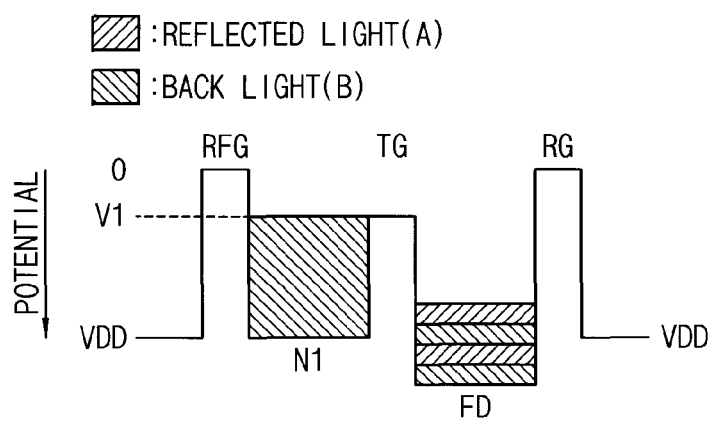
Figure 8F:
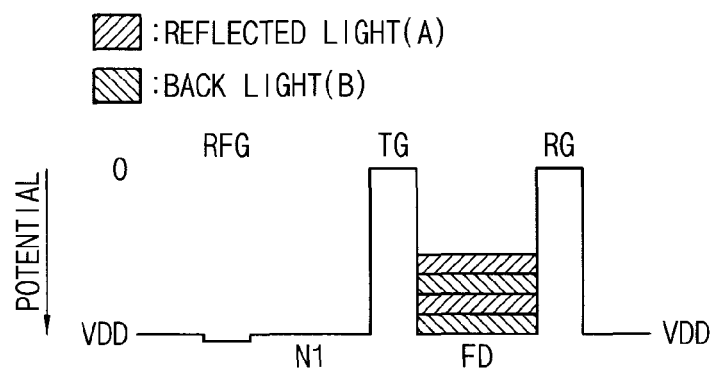
Figure 8G:
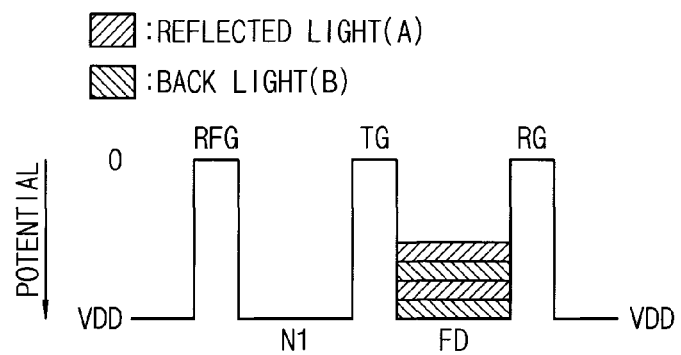
Figure 8H:
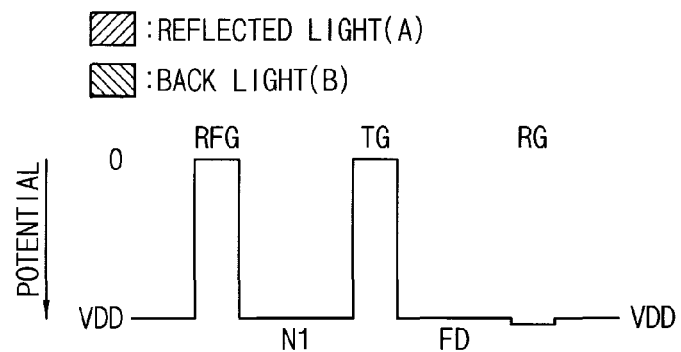
Figure 8I:
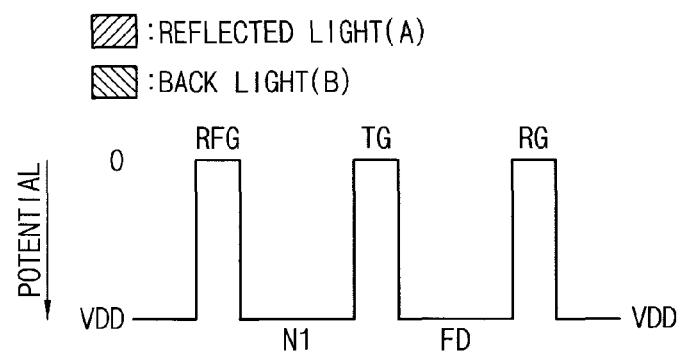

Since transmission signal (TX) is activated to the first voltage V1 during the second period P2 and the fifth period P5, the voltage of the floating diffusion node FD may be boosted because of the boosting effect caused by the boosting capacitor 128 as illustrated in FIGS. 8B and 8E. As such, the charge stored in the first node N1 may be transferred to the floating diffusion node FD through the transmission transistor 121 more rapidly compared to the case of the pixel circuit 101a of FIG. 2.

In addition, as illustrated in FIGS. 4B and 4E, as the quantity of charge accumulated in the floating diffusion node FD increases during the second period P2 and/or the fifth period P5, the charge accumulated in the floating diffusion node FD may move back to the first node N1 across an energy barrier of the transmission transistor 121.

However, according to the pixel circuit 101b of FIG. 7, as illustrated in FIGS. 8B and 8E, the electric potential of the floating diffusion node FD is boosted by a boosting effect of the boosting capacitor 128 during the second period P2 and the fifth period P5. Therefore, although the quantity of charge accumulated in the floating diffusion node FD increases, the charge accumulated in the floating diffusion node FD may be effectively prevented from moving back to the first node N1 across an energy barrier of the transmission transistor 121.

Figure 9:
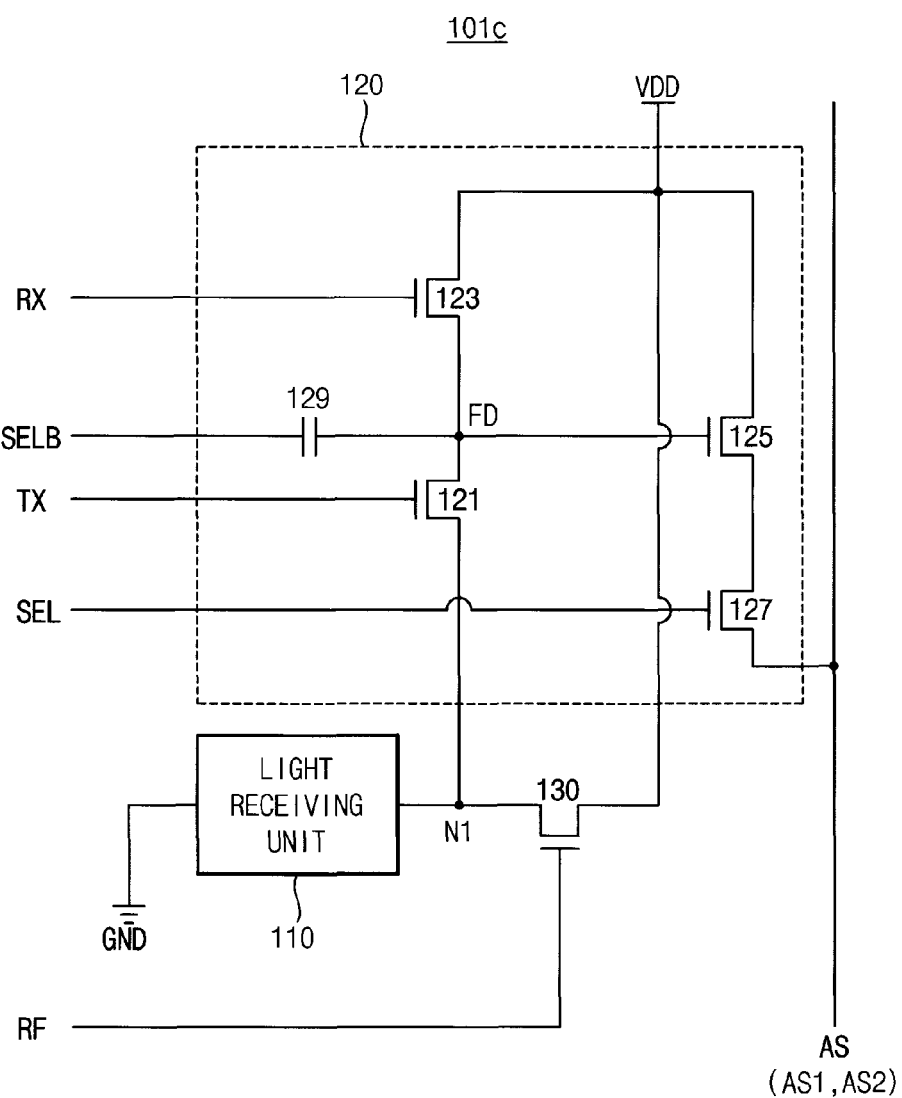
FIG. 9 is a block diagram illustrating another example of a pixel circuit included in a depth sensor of FIG. 1.
Figure 10A:
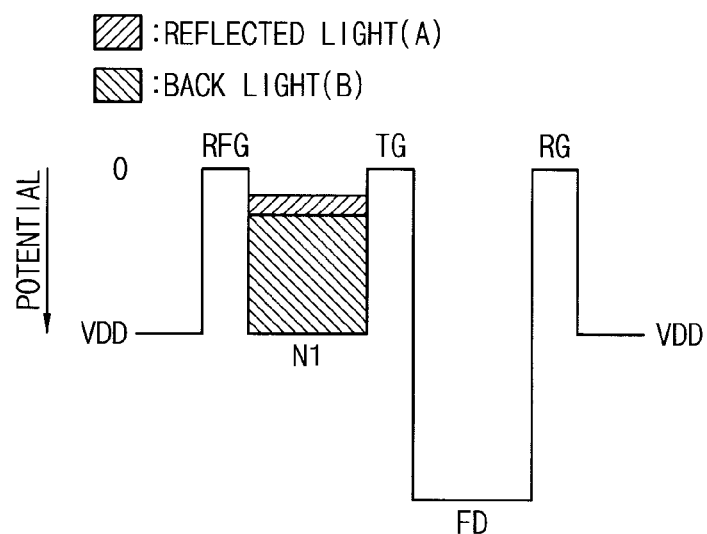
FIGS. 10A to 10I are diagrams for describing a change of an electrical potential and a flow of charge in a pixel circuit of FIG. 9 in a first operation mode.
Figure 10B:
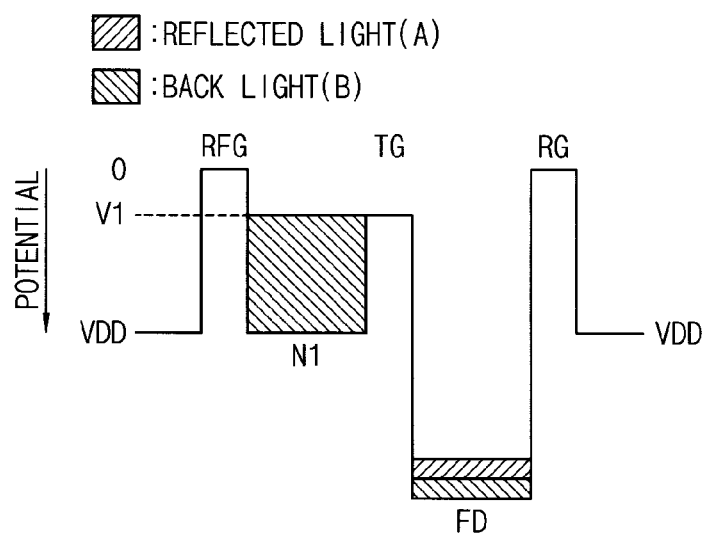
Figure 10C:
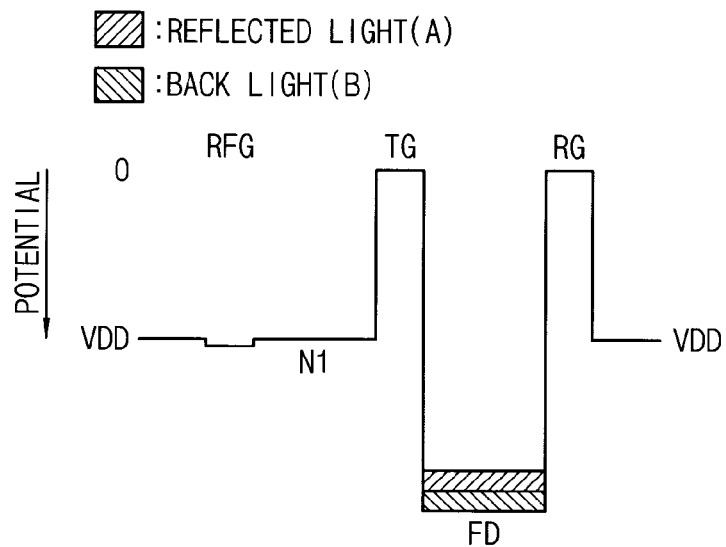
Figure 10D:
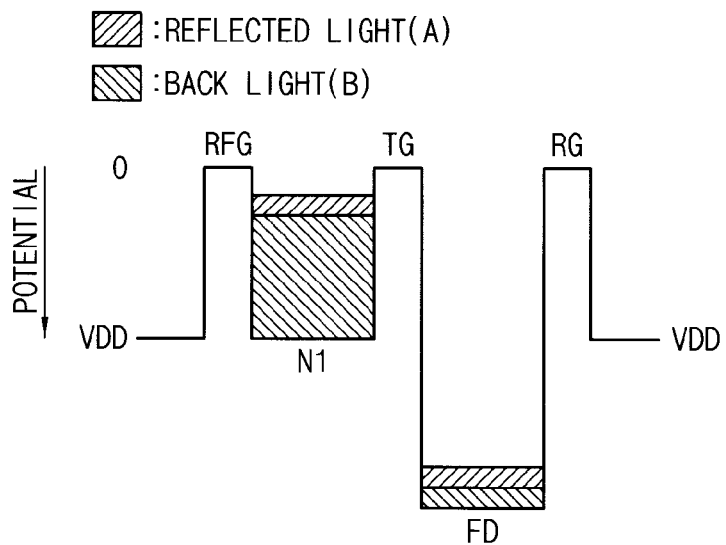
Figure 10E:
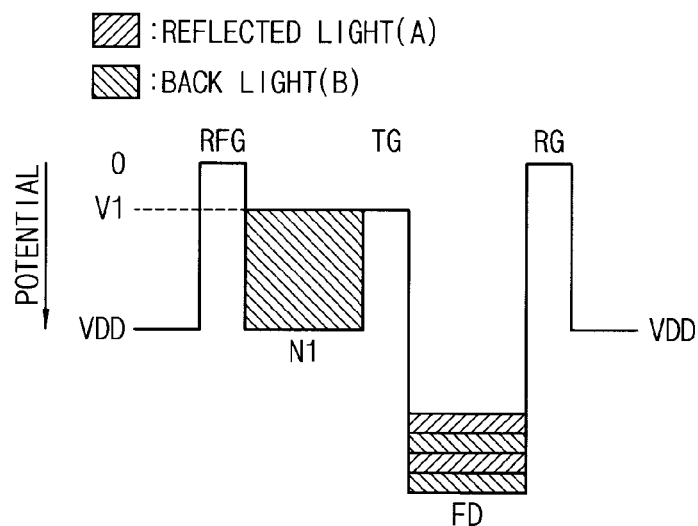
Figure 10F:
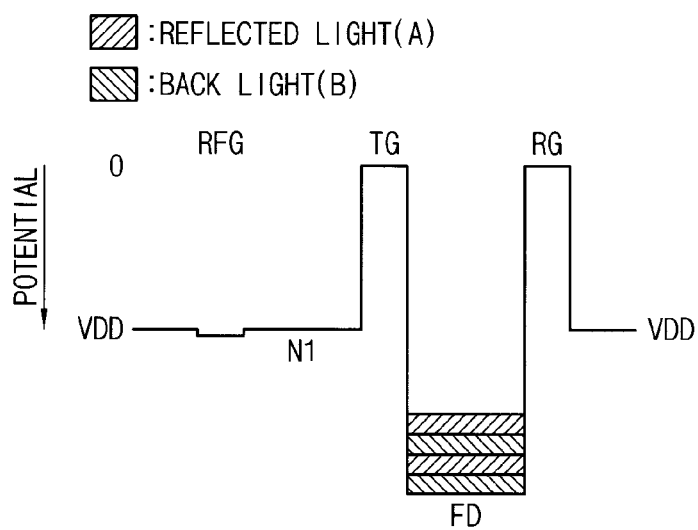
Figure 10G:
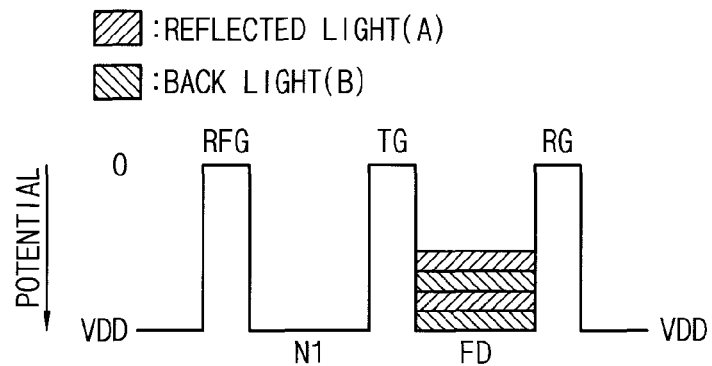
Figure 10H:
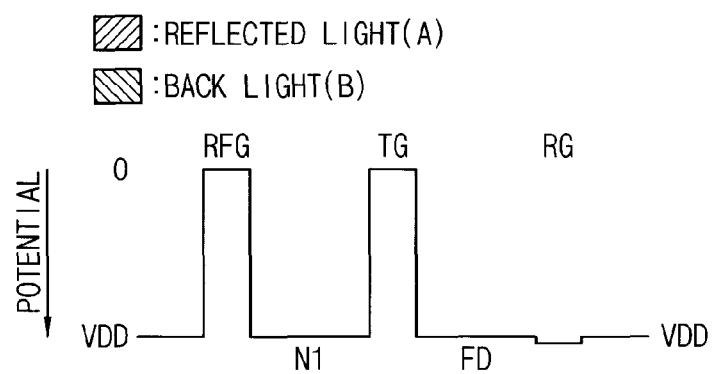
Figure 10I:
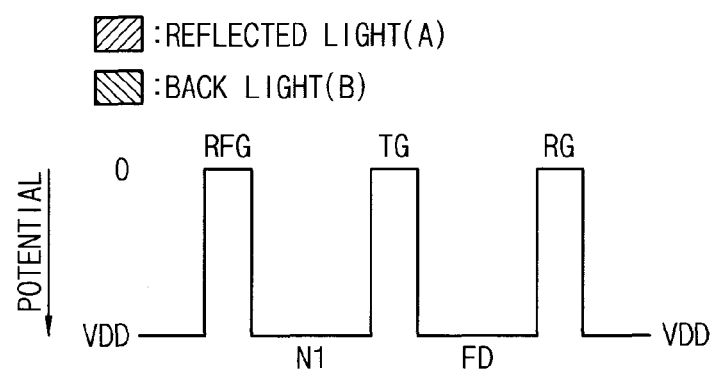

FIG. 9 is a block diagram illustrating yet another example of a pixel circuit consistent with embodiments of the inventive concept that may be included in the depth sensor of FIG. 1.

Referring to FIG. 9, a pixel circuit 101c comprises a light receiving unit 110, a signal generation unit 120 and a refresh transistor 130.

Comparing the pixel circuit 101c of FIG. 9 with the pixel circuit 101a of FIG. 2, the signal generation unit 120 included in the pixel circuit 101c of FIG. 9 further includes a boosting capacitor 129. The structure and operation of the pixel circuit 101a of FIG. 2 are described above with reference to FIGS. 1 to 6C, and are therefore omitted here to avoid undue repetition.

The boosting capacitor 129 may have a first electrode connected to the floating diffusion node FD and a second electrode receiving an inverted selection signal (SELB). The inverted selection signal SELB is an inverted version of the selection signal (SEL). The boosting capacitor 129 may boost a voltage of the floating diffusion node FD using a boosting effect during the detection period DP in which the selection signal (SEL) is inactivated such that the inverted selection signal (SELB) is activated. If the voltage of the floating diffusion node FD is boosted during the detection period DP, the charge stored in the first node N1 may be rapidly transferred to the floating diffusion node FD through the transmission transistor 121, and the charge accumulated in the floating diffusion node FD may be effectively prevented from moving back to the first node N1.

As in the same case of the pixel circuit 101a of FIG. 2, the pixel circuit 101c of FIG. 9 may operate in the first operation mode using signals illustrated in FIG. 3, and operate in the second operation mode using signals illustrated in FIG. 5.

FIGS. 10A to 10I are voltage diagrams further illustrating change in electrical potential and charge flow for the pixel circuit of FIG. 9 in a first operation mode. That is, FIGS. 10A to 10I represents changes in the electrical potential and charge flow for the pixel circuit 101c of FIG. 9 during from the first period P1 to the ninth period P9, respectively, in the first operation mode.

Hereinafter, operation of the pixel circuit 101c in the first operation mode will be described with reference to FIGS. 1, 3, 9 and 10A to 10I.

The boosting capacitor 129 may receive the inverted selection signal (SELB) at the second electrode, so that the boosting capacitor 129 may not boost the voltage of the floating diffusion node FD during the output period OP in which the selection signal (SEL) is activated such that the inverted selection signal (SELB) is inactivated. Therefore, an operation of the pixel circuit 101c of FIG. 9 may be substantially the same as the pixel circuit 101a of FIG. 2 during the output period OP that includes the seventh period P7, the eighth period P8, and the ninth period P9. Therefore, detailed description about FIGS. 10G, 10H, and 10I will be omitted here.

Referring to FIG. 3, the selection signal (SEL) is inactivated, so that the inverted selection signal (SELB) is activated throughout the detection period DP that includes from the first period P1 to the sixth period P6. Therefore, as illustrated in FIGS. 10A to 10F, the voltage of the floating diffusion node FD may be boosted because of the boosting effect caused by the boosting capacitor 129 throughout the detection period DP.

As such, the charge stored in the first node N1 may be transferred to the floating diffusion node FD through the transmission transistor 121 more rapidly compared to the case of the pixel circuit 101a of FIG. 2. In addition, although the number of charge accumulated in the floating diffusion node FD increases, the charge accumulated in the floating diffusion node FD may be effectively prevented from moving back to the first node N1 across an energy barrier of the transmission transistor 121.

Referring again to FIG. 1, when the floating diffusion node FD is saturated, the pixel circuit 101 may output the first analog signal (AS1) having a maximum value. Therefore, the analog digital conversion unit 300 may compare a magnitude of the first analog signal AS1 received from the plurality of pixel circuits 101 with the reference value to generate the saturation signal (SAT) and provide the saturation signal (SAT) to the control unit 200. For example, when the level of the first analog signal (AS1) is greater than or equal to the reference value, the analog digital conversion unit 300 may determine that the floating diffusion node FD is saturated and generate a high saturation signal (SAT). On the other hand, when the level of the first analog signal (AS1) is less than the reference value, the analog digital conversion unit 300 may determine that the floating diffusion node FD is not saturated and generates a low saturation signal (SAT).

The control unit 200 may operate in the first operation mode when the saturation signal (SAT) is high, and in the second operation mode when the saturation signal (SAT) is low.

As such, the depth sensor 10 according to embodiments of the inventive concept operates in one of a first operation mode and a second operation mode based on the intensity of ambient light. For example, the depth sensor 10 may operate in the first operation mode when an intensity of the ambient light is relatively high, and the depth sensor 10 may operate in the second operation mode when the intensity of the ambient light is relatively low. Therefore, the depth sensor 10 may be able to provide distance information for a target object under any ambient light conditions.

Figure 11:
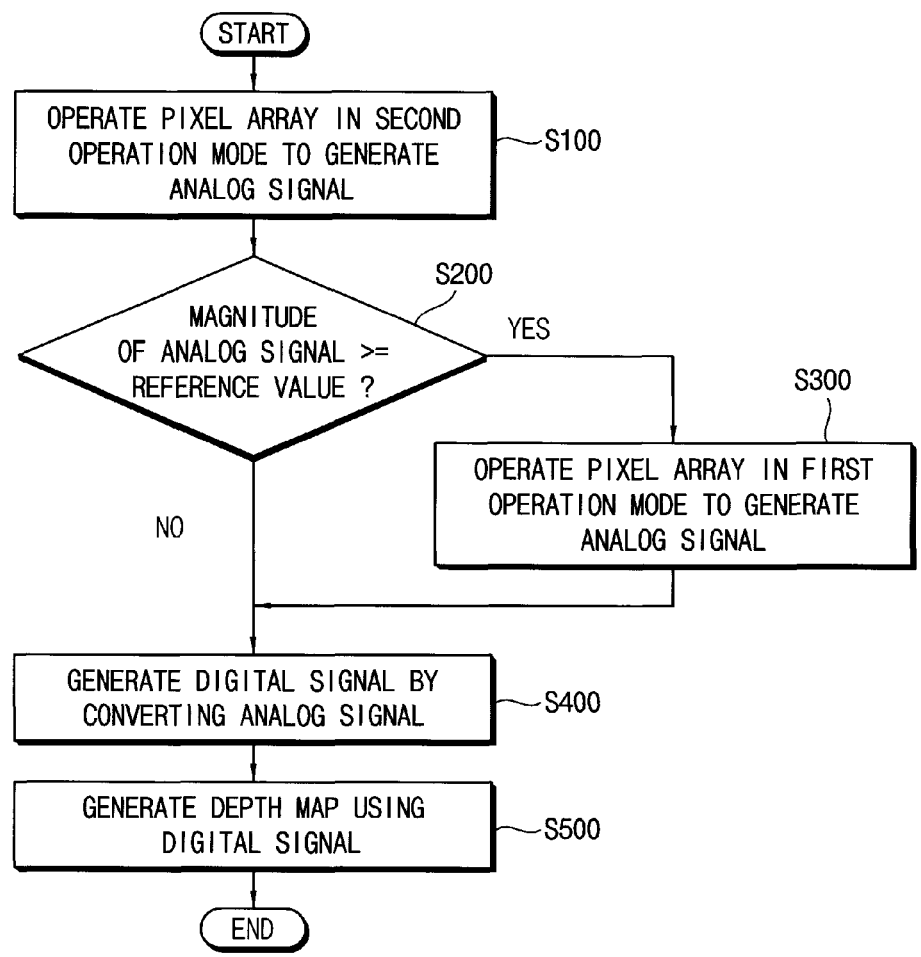
FIG. 11 is a flow chart illustrating a method of driving a depth sensor of FIG. 1.

FIG. 11 is a flow chart summarizing a control method for operating (or "driving") the depth sensor of FIG. 1.

Hereinafter, a method of driving the depth sensor 10 of FIG. 1. will be described with reference to FIGS. 1 to 11.

The control unit 200 operates the plurality of pixel circuits 101 included in the pixel array 100 in the second operation mode, and the plurality of pixel circuits 101 generates the analog signal (AS) having a magnitude corresponding to an intensity of the incident light in the second operation mode (S100). In particular, the control unit 200 may provide each of the plurality of pixel circuits 101 with the transmission signal (TX), reset signal (RX), selection signal SEL, and refresh signal (RF) as illustrated in FIG. 5, and each of the plurality of pixel circuits 101 generates the analog signal (AS) having a level corresponding to the intensity of the incident light based on the transmission signal (TX), reset signal (RX), selection signal SEL, and refresh signal (RF). Each of the plurality of pixel circuits 101 may continuously accumulate charge generated by the light receiving unit 110 to the floating diffusion node FD during the detection period DP, and consecutively output the first analog signal AS1 having a level corresponding to a voltage apparent at the floating diffusion node FD which is proportional to the charge accumulated in the floating diffusion node FD, and the second analog signal (AS2) having a level corresponding to a voltage apparent at the floating diffusion node FD in the reset state during the output period OP.

The analog digital conversion unit 300 compares a level of the analog signal (AS) received from the plurality of pixel circuits 101 with the reference value (S200). When the floating diffusion node FD is saturated, the pixel circuit 101 outputs the first analog signal (AS1) having a maximum value. Therefore, the reference value may be set as a level of the first analog signal (AS1) when the floating diffusion node FD is saturated.

If the magnitude of the analog signal (AS) is greater than or equal to the reference value, the analog digital conversion unit 300 provides a high saturation signal (SAT) to the control unit 200. The control unit 200 operates the plurality of pixel circuits 101 included in the pixel array 100 during the first operation mode, and the plurality of pixel circuits 101 generates the analog signal (AS) having a level corresponding to the intensity of the incident light during the first operation mode (S300). In particular, the control unit 200 provides each of the plurality of pixel circuits 101 with the transmission signal (TX), reset signal (RX), selection signal SEL, and refresh signal (RF) as illustrated in FIG. 3, and each of the plurality of pixel circuits 101 generates the analog signal (AS) having a level corresponding to the intensity of the incident light based on the transmission signal (TX), reset signal (RX), selection signal SEL, and refresh signal (RF). Each of the plurality of pixel circuits 101 may accumulate a first charge portion generated by the light receiving unit 110 at the floating diffusion node FD and discharge a second remaining charge portion to the supply voltage VDD at least once during the detection period DP, and consecutively output the first analog signal (AS1) having a level corresponding to a voltage apparent at the floating diffusion node FD which is proportional to the charge accumulated in the floating diffusion node FD, and the second analog signal (AS2) having a level corresponding to a voltage apparent at the floating diffusion node FD in the reset state during the output period OP.

As noted above, the analog digital conversion unit 300 may be used to convert the analog signal (AS) into a corresponding digital signal DS (S400).

When the depth sensor 10 further includes the image signal processor 400, the image signal processor 400 may generates a depth map DM, which is an image representing the distance from the depth sensor 10 to a target object, using the digital signal DS (S500).

Figure 12:
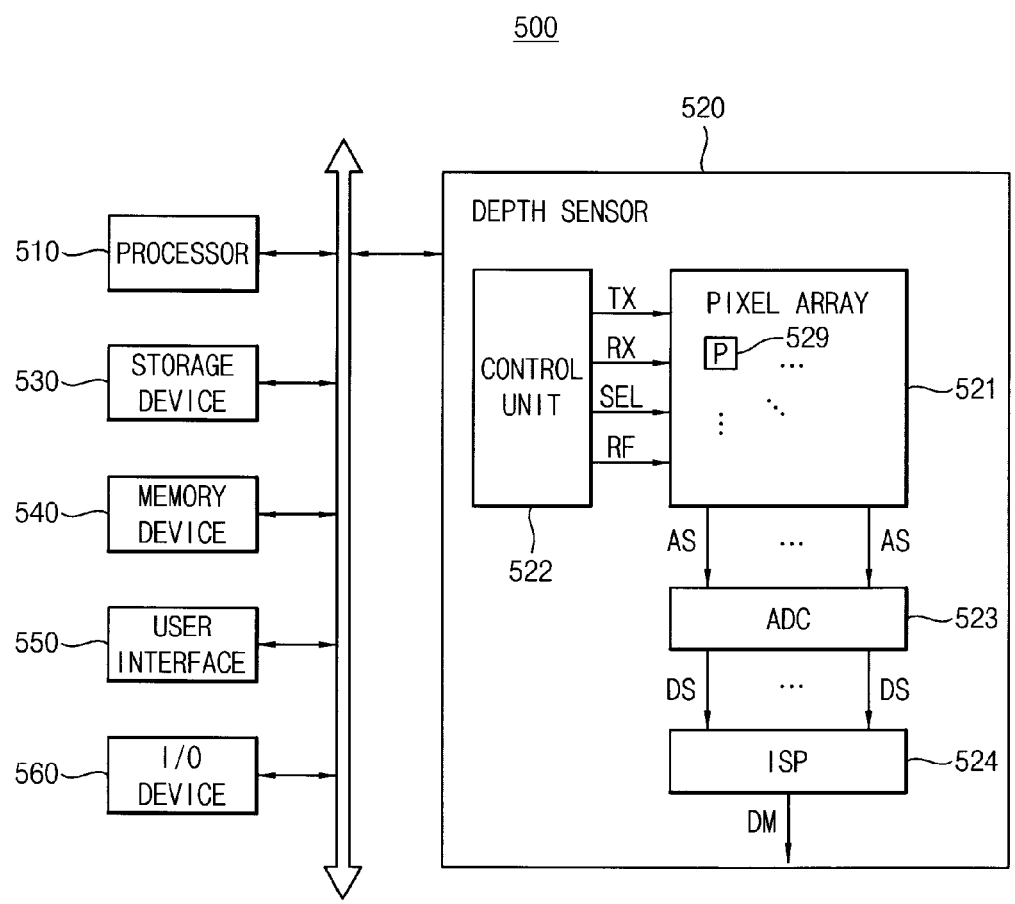
FIG. 12 is a block diagrams illustrating a system according to embodiments.

FIG. 12 is a block diagram illustrating a system incorporating a depth sensor according to certain embodiments of the inventive concept.

Referring to FIG. 12, a system 500 generally comprises a processor 510, a depth sensor 520, and a storage device 530.

The processor 510 controls the depth sensor 520 and the storage device 530. The processor 510 may perform various computational functions, such as executing specific software for performing specific calculations or tasks. For example, the processor 510 may be a microprocessor or a central processing unit (CPU). The processor 510 may be connected to the depth sensor 520 and the storage device 2300 via bus such as an address bus, a control bus or a data bus, etc. The processor 510 may be connected to an extended bus, such as peripheral component interconnect (PCI) bus.

The processor 510 may be embodied as a single core architecture or a multi core architecture. For example, the processor 510 may be embodied as a single core architecture when an operating frequency of the processor 510 is less than 1 GHz, and the processor 510 may be embodied as a multi core architecture when an operating frequency of the processor 510 is greater than 1 GHz. The processor 510 that is embodied as a multi core architecture may communicate with peripheral devices via an advanced extensible interface (AXI) bus.

The depth sensor 520 generates a depth map DM, which is an image representing the distance from the depth sensor 520 to an object. For example, the depth sensor 520 may emits light using a light source to the object, senses light reflected in the object, and calculates distance from the depth sensor 520 to the object using a time of flight of the emitted light.

The depth sensor 520 may includes a pixel array 521, a control unit 522, an analog-digital conversion unit ADC 523, and an image signal processor ISP 524.

The pixel array 521 includes a plurality of pixel circuits P 529 arranged in a matrix form. Each of the plurality of pixel circuits 529 detects incident light and generates an analog signal AS having a magnitude corresponding to an intensity of the incident light.

The control unit 522 provides each of the plurality of pixel circuits 529 with the transmission signal (TX), reset signal (RX), selection signal (SEL), and refresh signal (RF) to control each of the plurality of pixel circuits 529.

For example, during a detection period, each of the plurality of pixel circuits 529 may generate charge in response to the incident light and accumulate the charge in a floating diffusion node based on the transmission signal (TX), reset signal (RX) and refresh signal (RF). During an output period, the control unit 522 selects one of a plurality of rows included in the pixel array 521 in a consecutive order using the selection signal (SEL), and pixel circuits 529 included in a selected row generate the analog signal (AS) having a level corresponding to a quantity of charge accumulated in the floating diffusion node.

The analog digital conversion unit 523 converts the analog signal AS received from each of the plurality of pixel circuits 529 into a digital signal DS.

The image signal processor 524 may generate the depth map DM, which is an image representing the distance from the depth sensor 520 to an object, using the digital signal DS.

The depth sensor 520 may be embodied as a system on chip (SoC).

The depth sensor 520 may be embodied as the depth sensor 10 of FIG. 1. The structure and operation of the depth sensor 10 of FIG. 1 have been described with reference to FIGS. 1 to 11. Therefore, a detail description of the depth sensor 520 will be omitted.

The storage device 530 stores the depth map DM received from the depth sensor 520. The storage device 530 may include a non-volatile memory device such as a flash memory, a solid state drive, a hard disk drive, a compact disk read-only memory (CD-ROM) drive, etc.

The system 500 may further include a memory device 540, a user interface 550, and an input/output device 560. Although not illustrated in FIG. 12, the system 500 may further include ports to communicate with a video card, a sound card, a memory card, a universal serial bus (USB) device, etc.

The memory device 540 may store data for operations of the system 500. For example, the memory device 540 may include at least one volatile memory device such as a dynamic random access memory (DRAM) device, a static random access memory (SRAM) device, etc. and/or at least one non-volatile memory device such as an erasable programmable read-only memory (EPROM) device, an electrically erasable programmable read-only memory (EEPROM) device, a flash memory device, etc.

The user interface 550 may include devices required for a user to control the computing system 500. The input/output device 560 may include at least one input device (e.g., a touch screen, a keypad, a keyboard, a mouse, etc.) and/or at least one output device (e.g., a display device, a printer, a speaker, etc.).

In some embodiments, the system 500 may be a three dimensional camera device. In this case, the system 500 may further include an image sensor that generates color information of an object. The processor 510 may generate a three dimensional video data using both the color information generated by the image sensor and the depth map DM generated by the depth sensor 520. The storage device 530 may store the three dimensional video data.

In other embodiments, the system 500 may be any electronic apparatus having a touchless user interface. In this case, the depth sensor 520 may operate as a touchless sensor. For example, the system 500 may detect a change of distance from the system 500 to a user using the depth map DM generated by the depth sensor 520, and generate an input signal based on the change of distance although the user does not directly touch the system 500. The system 500 may comprise any of several types of electronic devices, such as a mobile device, a smart phone, a cellular phone, a personal digital assistant (PDA), a desktop computer, a laptop computer, a work station, a handheld device, a personal media player (PMP), a digital camera, or the like.

The foregoing is illustrative of other embodiments of the inventive concept and is not to be construed as limiting thereof. Although a few embodiments have been described, those skilled in the art will readily appreciate that many modifications are possible in the embodiments without materially departing from the novel teachings and advantages of the present inventive concept. Accordingly, all such modifications are intended to be included within the scope of the present inventive concept as defined in the claims. Therefore, it is to be understood that the foregoing is illustrative of various embodiments and is not to be construed as limited to the specific embodiments disclosed, and that modifications to the disclosed embodiments, as well as other embodiments, are intended to be included within the scope of the appended claims.

What is claimed is:

1. A pixel circuit for a depth sensor operating during a detection period and an output period following the detection period, wherein the pixel circuit is configured to operate in a first operating mode when an intensity of incident light is high and to operate in a second operating mode when the intensity of incident light is low, the pixel circuit comprising:
   a light receiving unit configured to generate charge in response to incident light;
   a signal generation unit configured to accumulate the charge in a floating diffusion node (FDN) in response to a transmission signal, a reset signal and a selection signal during the detection period, and configured to generate an analog signal having a level corresponding to a voltage apparent at the FDN during the output period; and
   a refresh transistor coupled between a supply voltage and the light receiving unit and configured to discharge the charge to the supply voltage in response to a refresh signal.

2. The pixel circuit of claim 1, wherein the signal generation unit comprises:
   a transmission transistor having a source connected to the light receiving unit, a drain connected to the FDN, and a gate receiving the transmission signal;

a reset transistor having a source connected to the FDN, a drain connected to the supply voltage, and a gate receiving the reset signal;

a drive transistor having a source, a drain connected to the supply voltage, and a gate connected to the FDN; and a selection transistor having a source providing the analog signal, a drain connected to the source of the drive transistor, and a gate receiving the selection signal.

3. The pixel circuit of claim 2, wherein during the detection period and while operating in the first operating mode, the transmission transistor is configured to accumulate a first portion of the charge in the FDN, and the refresh transistor is configured to discharge a remaining second portion of the charge to the supply voltage, and during the detection period and while operating in the second operating mode, the transmission transistor is configured to accumulate the charge in the FDN and the refresh transistor is configured to prevent the charge from being discharged to the supply voltage.

4. The pixel circuit of claim 3, wherein the output period comprises successive first period, second period and third period, such that;

the selection transistor provides a first analog signal having a level corresponding to a quantity of the charge accumulated in the FDN during the first period of the output period, the reset transistor turns ON to discharge charge accumulated in the FDN to the supply voltage to place the FDN in a reset state during the second period of the output period, and the selection transistor provides a second analog signal having a level corresponding to a voltage apparent at the FDN in the reset state during the third period of the output period.

5. The pixel circuit of claim 2, wherein the selection signal and the reset signal are inactivated during the detection period, and the transmission signal and the refresh signal are successively activated at least once during the detection period in the first operation mode.

6. The pixel circuit of claim 5, wherein the transmission signal is activated to a first voltage and the refresh signal is activated to a second voltage greater than the first voltage during the detection period in the first operation mode.

7. The pixel circuit of claim 6, wherein the transmission transistor relatively weakly turns ON while the transmission signal is activated to the first voltage to pass a first portion of the charge to the FDN, and the refresh transistor relatively strongly turns ON while the refresh signal is activated to the second voltage to discharge a second remaining portion of the charge to the supply voltage during the detection period in the first operation mode.

8. The pixel circuit of claim 5, wherein the transmission signal and the refresh signal are inactivated and the selection signal is activated throughout the output period, and the reset signal is activated only during a portion of the output period in the first operation mode.

9. The pixel circuit of claim 2, wherein the selection signal, the reset signal and the refresh signal are inactivated, and the transmission signal is activated throughout the entire detection period in the second operation mode.

10. The pixel circuit of claim 9, wherein the transmission transistor relatively strongly turns ON to accumulate the charge in the FDN, and the refresh transistor turns OFF to prevent the charge from being discharged to the supply voltage throughout the detection period in the second operation mode.

11. The pixel circuit of claim 9, wherein the refresh signal is inactivated, and the transmission signal and the selection signal are activated throughout the output period, and the reset signal is activated during a only portion of the output period in the second operation mode.

12. The pixel circuit of claim 2, wherein the signal generation unit further comprises a boosting capacitor having a first electrode connected to the FDN and a second electrode receiving the transmission signal.

13. The pixel circuit of claim 2, wherein the signal generation unit further comprises a boosting capacitor having a first electrode connected to the FDN and a second electrode receiving an inverted selection signal, the inverted selection signal being an inverted version of the selection signal.

14. A depth sensor, comprising:

a pixel array including a plurality of pixel circuits arranged in a matrix, each of the plurality of pixel circuits being configured to generate an analog signal having a level corresponding to an intensity of incident light;

a control unit configured to provide each of the plurality of pixel circuits with a transmission signal, a reset signal, a selection signal and a refresh signal to control each of the plurality of pixel circuits to operate in a first operating mode when the intensity of incident light is high and in a second operating mode when the intensity of incident light is low, wherein the first operating mode and the second operating mode include a detection period and an output period following the detection period; and an analog digital conversion unit configured to convert the analog signal received from each of the plurality of pixel circuits into a digital signal, wherein each of the plurality of pixel circuits comprises:

a light receiving unit configured to generate charge in response to the incident light;

a signal generation unit configured to accumulate the charge in a floating diffusion node (FDN) in response to the transmission signal, the reset signal and the selection signal during the detection period, and configured to generate an analog signal having a level corresponding to a voltage apparent at the FDN during the output period; and a refresh transistor coupled between a supply voltage and the light receiving unit and configured to discharge the charge to the supply voltage in response to the refresh signal.

15. The depth sensor of claim 14, wherein the control unit is further configured during the first operating mode to provide the plurality of pixel circuits with an inactivated selection signal and an inactivated reset signal throughout the detection period, and successively activated transmission signal and refresh signal at least once during the detection period, and the control unit is further configured during the second operating mode to provide the plurality of pixel circuits with the inactivated selection signal, inactivated reset signal, an inactivated refresh signal, and an activated transmission signal throughout the detection period.

16. The depth sensor of claim 15, wherein the analog digital conversion unit is further configured to compare a level of the analog signal with a reference value and generate a saturation signal, such that the control unit operates in one of the first operating mode and the second operating mode in response to the saturation signal.

17. A method of operating a depth sensor including a pixel circuit, the method comprising:

receiving incident light to generate charge in response to the incident light at the pixel circuit;

determining whether an intensity of the incident light is high or low;

providing the pixel circuit with a transmission signal, a reset signal, a selection signal and a refresh signal to operate the pixel circuit in a first operating mode when the intensity of incident light is high and in a second operating mode when the intensity of incident light is low, wherein the first operating mode and the second operating mode include a detection period and an output period following the detection period;

during the detection period and while operating in the first operating mode, accumulating a first portion of the charge in the floating diffusion node (FDN), and then discharging a remaining second portion of the charge to a supply voltage; and during the detection period and while operating in the second operating mode, accumulating the charge in the FDN and then preventing discharge of the charge to the supply voltage.

18. The method of claim 17, wherein the output period comprises successive first period, second period and third period and the method further comprises:

providing a first analog signal having a level corresponding to a quantity of the charge accumulated in the FDN during the first period of the output period;

discharging charge accumulated in the FDN to the supply voltage to place the FDN in a reset state during the second period of the output period; and providing a second analog signal having a level corresponding to a voltage apparent at the FDN in the reset state during the third period of the output period.

19. The method of claim 18, wherein the selection signal and the reset signal are inactivated during the detection period, and the transmission signal and the refresh signal are successively activated at least once during the detection period in the first operation mode.

20. The method of claim 19, wherein the transmission signal is activated to a first voltage and the refresh signal is activated to a second voltage greater than the first voltage during the detection period in the first operation mode.

* * * * *